(12) United States Patent
Higuchi et al.

(10) Patent No.: US 12,513,432 B2
(45) Date of Patent: Dec. 30, 2025

(54) PHOTON COUNTING DEVICE, PHOTON COUNTING METHOD, AND PHOTON COUNTING PROCESSING PROGRAM

(71) Applicant: HAMAMATSU PHOTONICS K.K., Hamamatsu (JP)

(72) Inventors: Takafumi Higuchi, Hamamatsu (JP); Teruo Takahashi, Hamamatsu (JP); Mao Nakajima, Hamamatsu (JP); Katsuhiro Nakamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 197 days.

(21) Appl. No.: 18/275,443

(22) PCT Filed: Dec. 24, 2021

(86) PCT No.: PCT/JP2021/048340
§ 371 (c)(1),
(2) Date: Aug. 2, 2023

(87) PCT Pub. No.: WO2022/185691
PCT Pub. Date: Sep. 9, 2022

(65) Prior Publication Data
US 2024/0314470 A1 Sep. 19, 2024

(30) Foreign Application Priority Data
Mar. 1, 2021 (JP) .................................. 2021-031788

(51) Int. Cl.
*H04N 25/773* (2023.01)
*G01J 1/44* (2006.01)
*H04N 25/618* (2023.01)

(52) U.S. Cl.
CPC .............. *H04N 25/773* (2023.01); *G01J 1/44* (2013.01); *H04N 25/618* (2023.01); *G01J 2001/442* (2013.01)

(58) Field of Classification Search
CPC ....... H04N 25/773; H04N 25/618; H01J 1/44; H01J 2001/442
See application file for complete search history.

(56) References Cited

U.S. PATENT DOCUMENTS 11,215,717 B2 * 1/2022 Maruno ............... H04N 25/671
11,843,890 B2 * 12/2023 Numata ................. H04N 25/74
2025/0016475 A1 * 1/2025 Higuchi ................ H04N 25/76

FOREIGN PATENT DOCUMENTS

JP   2006-352716 A   12/2006
JP   2020-038129 A    3/2020

(Continued)

OTHER PUBLICATIONS

Ma, Jiaju et al., "Photon-number-resolving megapixel image sensor at room temperature without avalanche gain," Optica, vol. 4, No. 12; , Dec. 2017, pp. 1474-1481.

(Continued)

*Primary Examiner* — Marly S Camargo
(74) *Attorney, Agent, or Firm* — Faegre Drinker Biddle & Reath LLP

(57) ABSTRACT

A photon counting device includes: a plurality of pixels each including a photoelectric conversion element and an amplifier amplifying charge to which input light is converted by the photoelectric conversion element and converting the amplified charge to a voltage; an A/D converter converting a voltage output from the amplifier of each of the plurality of pixels to a digital value; a first derivation unit configured to derive a provisional value of photon number in each of the plurality of pixels based on the digital value; and a second derivation unit configured to derive a confirmed value of (Continued)

photon number in a target pixel based on a first probability associated with a photon number distribution and a second probability associated with reading noise.

23 Claims, 33 Drawing Sheets

(56) References Cited

FOREIGN PATENT DOCUMENTS

| | | |
|---|---|---|
| JP | 2020-096646 A | 6/2020 |
| WO | WO-2019/102636 A1 | 5/2019 |
| WO | WO-2019/102637 A1 | 5/2019 |

OTHER PUBLICATIONS

Masoodian, Saleh et al., "A 1Mjot 1040fps 0.22e-rms Stacked BSI Quanta Image Sensor with Cluster-Parallel Readout," 2017 International Image Sensor Workshop (IISW), May 30-Jun. 2, 2017, pp. 230-233.

Starkey, Dakota A. et al., "Determining Conversion Gain and Read Noise Using a Photon-Counting Histogram Method for Deep Sub-Electron Read Noise Image Sensors," Journal of the Electron Devices Society, vol. 4, No. 3, May 2016, pp. 129-135.

International Preliminary Report on Patentability mailed Sep. 14, 2023 for PCT/JP2021/048340.

Fossum Eric R., "Modeling the Performance of Single-Bit and Multi-Bit Quanta Image Sensors", IEEE Journal of the Electron Devices Society, IEEE, USA, vol. 1, No. 9, Sep. 1, 2013, p. 166-p. 174, XP011536322.

* cited by examiner

Fig.2

| | | |
|---|---|---|
| $k_1$ $R_1$ | $k_2$ $R_2$ | $k_3$ $R_3$ |
| $k_4$ $R_4$ | $k_0$ $R_0$ | $k_5$ $R_5$ |
| $k_6$ $R_6$ | $k_7$ $R_7$ | $k_8$ $R_8$ |

11 — 11c(11)

Fig.25
(a)
(b)
(c)
(d)
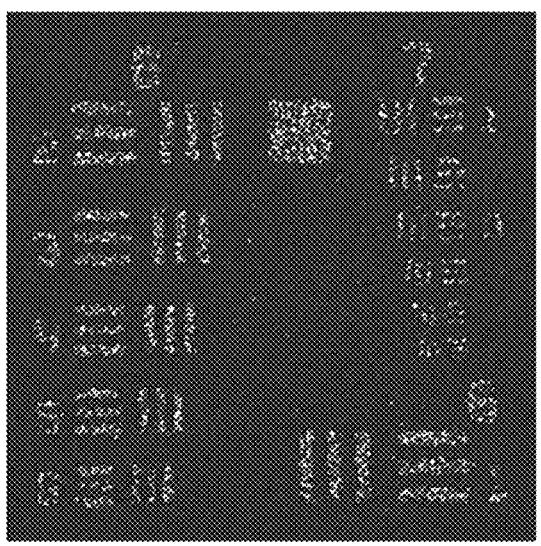
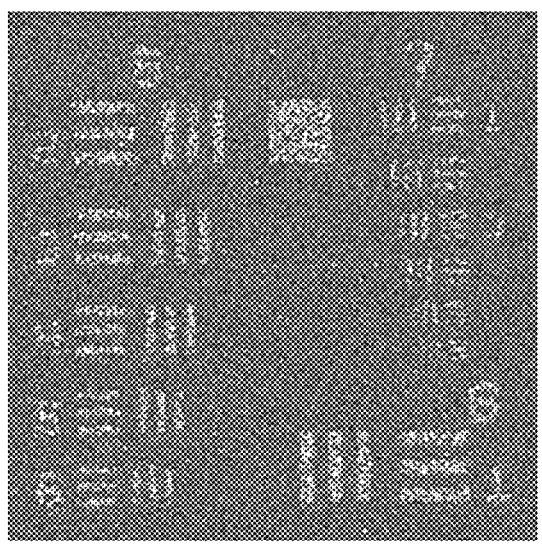
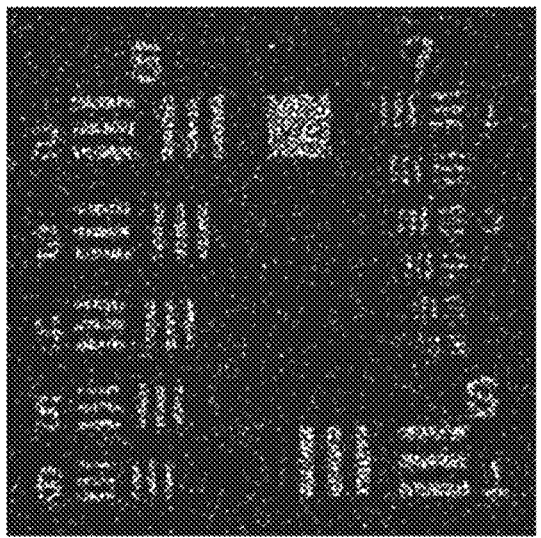
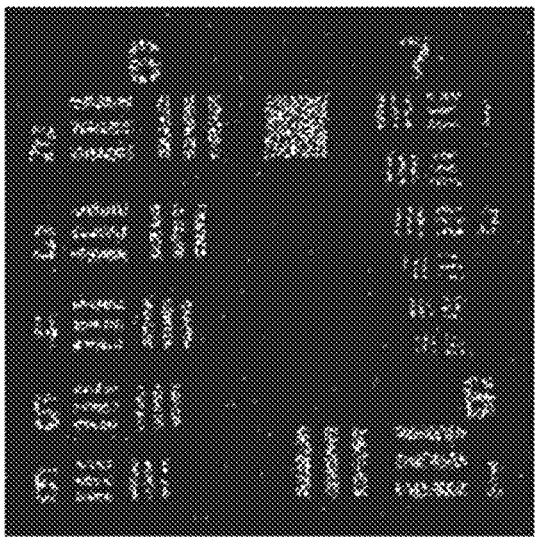

Fig.26
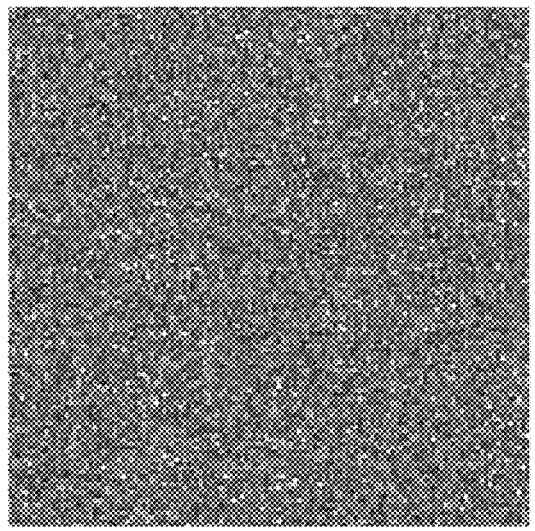
(a)
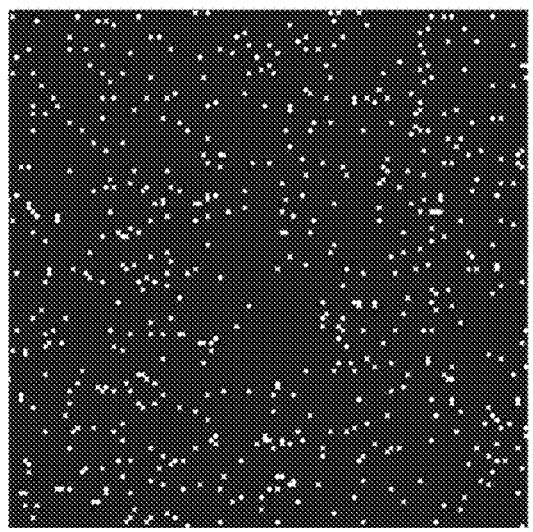
(b)
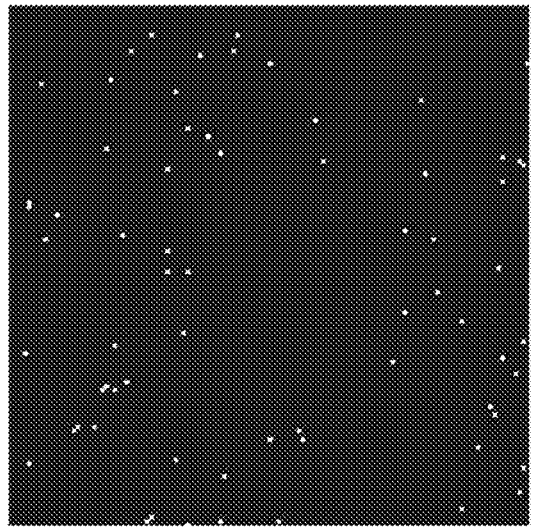
(c)

*Fig.27*
(a)
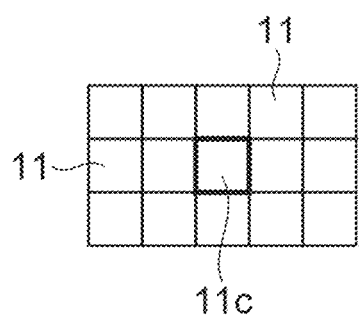
(b)
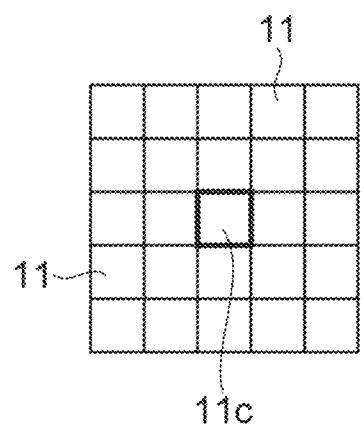

Fig.30
(a)
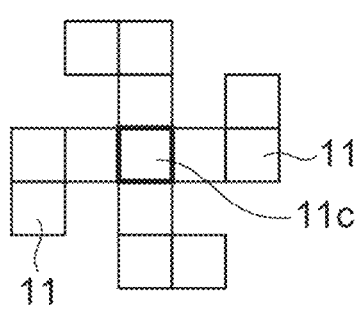
(b)
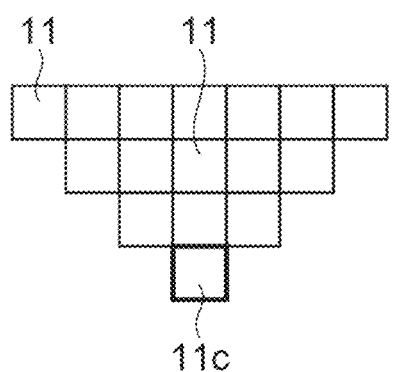
(c)
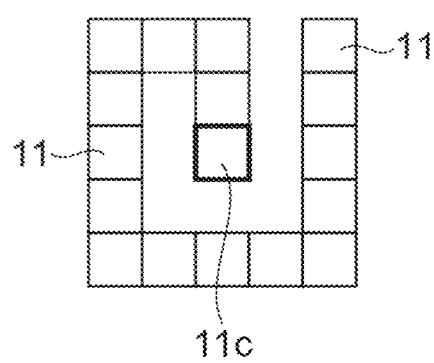
(d)
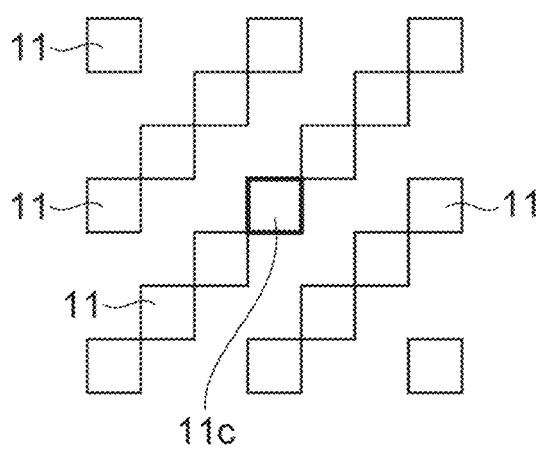

PHOTON COUNTING DEVICE, PHOTON COUNTING METHOD, AND PHOTON COUNTING PROCESSING PROGRAM

TECHNICAL FIELD

The present disclosure relates to a photon counting device, a photon counting method, and a photon counting processing program.

BACKGROUND ART

For example, a photon counting device using a complementary metal oxide semiconductor (CMOS) image sensor is described in Patent Literature 1 and Patent Literature 2. In this device, when photons are input to a photoelectric conversion element, photoelectrons generated based on the number of input photons are accumulated as charge. The charge accumulated in the photoelectric conversion element are converted to a voltage which is amplified by an amplifier. A voltage output from the amplifier is converted to a digital value by an A/D converter. In the photon counting device, photon number in a pixel of the image sensor is determined based on the digital value output from the A/D converter.

A technique related to photon counting using a CMOS image sensor is described in Non-Patent Literatures 1 to 3.

CITATION LIST

Patent Literature

[Patent Literature 1] PCT International Publication No. WO2019/102636
[Patent Literature 2] PCT International Publication No. WO2019/102637
[Non-Patent Literature 1] B. Saleh Masoodian, Jiaju Ma, Dakota Starkey, Yuichiro Yamashita, and Eric R. Fossum, "A 1Mjot 1040 fps 0.22e-rms Stacked BSI Quanta Image Sensor with Cluster-Parallel Readout," proceedings of 2017 International Image Sensor Workshop (IISW), May 30-Jun. 2, 2017, P230-p233
[Non-Patent Literature 2] JIAJU MA et al., "Photon-number-resolving megapixel image sensor at room temperature without avalanche gain," Optica, Vol. 4, No. 12, December 2017, p1474-p1481
[Non-Patent Literature 3] DAKOTA A. STARKEY et al., "Determining Conversion Gain and Read Noise Using a Photon-Counting Histogram Method for Deep Sub-Electron Read Noise Image Sensors," JOURNAL OF THE ELECTRON DEVICES SOCIETY, VOLUME 4, NO. 3, MAY 2016, p129-p135

SUMMARY OF INVENTION

Technical Problem

When photon counting is performed using the CMOS image sensor, reading noise which is random noise in the amplified voltage is generated at the time of reading of the voltage amplified by the amplifier. When the reading noise is large, a probability distribution of photoelectrons to be observed is broadened. Accordingly, the reading noise of each pixel needs to be small. However, when the CMOS image sensor is manufactured, the reading noise of pixels may be uneven within a predetermined range. In this case, there is concern about a decrease in counting accuracy of photons in a pixel with high reading noise.

An aspect of the present disclosure is for providing a photon counting device that can curb a decrease in counting accuracy of photons.

Solution to Problem

A photon counting device according to an example includes: a plurality of pixels each including a photoelectric conversion element converting input light to charge and an amplifier amplifying the charge to which the input light is converted by the photoelectric conversion element and converting the amplified charge to a voltage; an A/D converter converting a voltage output from the amplifier of each pixel of the plurality of pixels to a digital value; a first derivation unit configured to derive a provisional value of photon number in each of the plurality of pixels based on the digital value; and a second derivation unit configured to derive a confirmed value of photon number in a target pixel which is one of the plurality of pixels based on a first probability and a second probability, wherein the first probability is an observation probability for each photoelectron number in the target pixel based on a probability distribution of photoelectron number associated with a photon number distribution of the light, and the second probability is an observation probability for each photoelectron number at the provisional value of the target pixel based on a probability distribution of photoelectron number associated with reading noise of the target pixel.

In the photon counting device, the first derivation unit derives a provisional value of photon number in each pixel based on the magnitude of the digital value corresponding to an amount of charge generated in the corresponding pixel. For example, in a pixel with high reading noise, an error included in the derived provisional value may increase. The second derivation unit derives a confirmed value of photon number when the target pixel indicates the provisional value based on the probability distribution of the photoelectron number associated with the photon number distribution of light and the probability distribution of the photoelectron number associated with the reading noise. In this way, the confirmed value of the photon number is derived in consideration of the magnitude of the reading noise in the target pixel. Accordingly, since an influence of the reading noise on derivation of the confirmed value can be decreased, it is possible to improve accuracy of photon counting.

In the example, the second derivation unit may calculate a probability for each photoelectron number when the target pixel indicates the provisional value by calculating a product of the first probability and the second probability and determine the confirmed value based on the calculated probability. With this configuration, it is possible to acquire a most probable photon number by using a photoelectron number indicating a maximum value out of the probabilities for each photoelectron number when the target pixel indicates the provisional value as the confirmed value.

In the example, the probability distribution of the photoelectron number associated with the photon number distribution of the light may be a Poisson distribution, a super-Poissonian distribution, a sub-Poissonian distribution, a photon number distribution in a photon number squeezed state, a photon number distribution in a quantum-entangled photon state, a photon number distribution in a multi-mode squeezed state, a Bose-Einstein distribution, a logarithmic normal distribution, a uniform distribution, or a mixed distribution. With this configuration, it is possible to appropriately describe the probability distribution of the photoelectron number associated with the photon number distribution of light.

In the example, the probability distribution of the photoelectron number associated with the reading noise of the target pixel may be a normal distribution. With this configuration, it is possible to appropriately describe the probability distribution of the photoelectron number associated with the reading noise.

In the example, the second derivation unit may calculate an average value of the provisional value in neighboring pixels which are two or more pixels included in a partial area around the target pixel out of the plurality of pixels and calculate the first probability in consideration of the average value. With this configuration, it is possible to enhance the reliability of the first probability in consideration of the average value of the photoelectron number in the neighboring pixels.

In the example, the average value may be a weighted average including the reading noise of the neighboring pixels as a weighting. With this configuration, it is possible to obtain an average value with enhanced reliability of photoelectron number in the neighboring pixels in which the reading noise is low.

In the example, the average value may be a weighted average including distances between the target pixel and each of the neighboring pixels as a weighting. With this configuration, it is possible to obtain an average value with enhanced reliability of photoelectron number in the neighboring pixels near the target pixel.

In the example, the average value may be a weighted average including a weight for decreasing an error between the photon number of the neighboring pixels and the average value as a weighting. It is possible to expect improvement in calculation accuracy of an average value by using such a weighted average.

In the example, the second derivation unit may calculate the average value of the provisional value based on data of the provisional value in a plurality of frames. It is possible to expect improvement in calculation accuracy of an average value by using the provisional value in a plurality of frames in this way.

In the example, the second derivation unit may prepare photon counting data for the plurality of pixels based on the confirmed value derived using a pixel with the reading noise equal to or greater than a predetermined value out of the plurality of pixels as the target pixel and the provisional value of pixels with the reading noise less than the predetermined value out of the plurality of pixels. With this configuration, it is not necessary to perform an arithmetic operation of deriving the observation probability for pixels in which the reading noise is less than the predetermined value.

In the example, the second derivation unit may prepare photon counting data for the plurality of pixels based on the confirmed value which is derived using a pixel with the provisional value less than a predetermined value out of the plurality of pixels as the target pixel and the provisional value of pixels with the provisional value equal to or greater than the predetermined value out of the plurality of pixels. With this configuration, it is not necessary to perform an arithmetic operation of deriving the observation probability for pixels in which the provisional value is equal to or greater than the predetermined value.

In the example, the second derivation unit may include a noise map indicating the reading noise in each of the plurality of pixels. That is, the second derivation unit may derive the second probability with reference to data including the noise map.

A photon counting method according to an example includes: deriving a provisional value of photon number in each pixel of a plurality of pixels based on digital values corresponding to the plurality of pixels which are output from a two-dimensional image sensor including the plurality of pixels; and deriving a confirmed value of photon number in a target pixel which is one of the plurality of pixels based on a first probability and a second probability, wherein the deriving of the confirmed value includes calculating an observation probability for each photoelectron number in the target pixel as the first probability based on a probability distribution of photoelectron number associated with a photon number distribution of light and calculating an observation probability for each photoelectron number at the provisional value of the target pixel as the second probability based on a probability distribution of photoelectron number associated with reading noise of the target pixel.

In the photon counting method, a provisional value of photon number in each pixel is derived based on the magnitude of the digital value corresponding to an amount of charge generated in the corresponding pixel. For example, in a pixel with high reading noise, an error included in the derived provisional value may increase. A confirmed value of photon number when the target pixel indicates the provisional value is derived based on the probability distribution of the photoelectron number associated with the photon number distribution of light and the probability distribution of the photon number associated with the reading noise. In this way, the confirmed value of the photon number is derived in consideration of the magnitude of the reading noise in the target pixel. Accordingly, since an influence of the reading noise on derivation of the confirmed value can be decreased, it is possible to improve accuracy of photon counting.

In the example, the deriving of the confirmed value may include calculating a probability for each photoelectron number when the target pixel indicates the provisional value by calculating a product of the first probability and the second probability and determining the confirmed value based on the calculated probability. With this configuration, it is possible to acquire a most probable photon number by using a photoelectron number indicating a maximum value out of the probabilities for each photoelectron number when the target pixel indicates the provisional value as the confirmed value.

In the example, the deriving of the confirmed value may include using a Poisson distribution, a super-Poissonian distribution, a sub-Poissonian distribution, a photon number distribution in a photon number squeezed state, a photon number distribution in a quantum-entangled photon state, a photon number distribution in a multi-mode squeezed state, a Bose-Einstein distribution, a logarithmic normal distribution, a uniform distribution, or a mixed distribution as the probability distribution of the photoelectron number associated with the photon number distribution of the light. With this configuration, it is possible to appropriately describe the probability distribution of the photoelectron number associated with the photon number distribution of light.

In the example, the deriving of the confirmed value may include using a normal distribution as the probability distribution of the photoelectron number associated with the reading noise of the target pixel. With this configuration, it is possible to appropriately describe the probability distribution of the photoelectron number associated with the reading noise.

In the example, the deriving of the confirmed value may include calculating an average value of the provisional value in neighboring pixels which are two or more pixels included in a partial area around the target pixel out of the plurality of pixels and calculating the first probability in consideration of the average value. With this configuration, it is possible to enhance the reliability of the first probability in consideration of the average value of the photoelectron number in the neighboring pixels.

In the example, the deriving of the confirmed value may include using a weighted average including the reading noise of the neighboring pixels as a weighting as the average value. With this configuration, it is possible to obtain an average value with enhanced reliability of the photoelectron number in the neighboring pixels in which the reading noise is low.

In the example, the deriving of the confirmed value may include using a weighted average including distances between the target pixel and each of the neighboring pixels as a weighting as the average value. With this configuration, it is possible to obtain an average value with enhanced reliability of the photoelectron number in the neighboring pixels near the target pixel.

In the example, the deriving of the confirmed value may include using a weighted average including a weight for decreasing an error between the photon number of the neighboring pixels and the average value as a weighting as the average value. It is possible to expect improvement in calculation accuracy of an average value by using such a weighted average.

In the example, the deriving of the confirmed value may include calculating the average value of the provisional value based on data of the provisional value in a plurality of frames. It is possible to expect improvement in calculation accuracy of an average value by using the provisional value in a plurality of frames in this way.

The photon counting method according to the example may further include preparing photon counting data for the plurality of pixels based on the confirmed value derived using a pixel with the reading noise equal to or greater than a predetermined value out of the plurality of pixels as the target pixel and the provisional value of pixels with the reading noise less than the predetermined value out of the plurality of pixels. With this configuration, it is not necessary to perform an arithmetic operation of deriving the observation probability for pixels in which the reading noise is less than the predetermined value.

The photon counting method according to the example may further include preparing photon counting data for the plurality of pixels based on the confirmed value which is derived using a pixel with the provisional value less than a predetermined value out of the plurality of pixels as the target pixel and the provisional value of pixels with the provisional value equal to or greater than the predetermined value out of the plurality of pixels. With this configuration, it is not necessary to perform an arithmetic operation of deriving the observation probability for pixels in which the provisional value is equal to or greater than the predetermined value.

In the example, the deriving of the confirmed value may include referring to a noise map indicating the reading noise in each of the plurality of pixels. For example, the second probability may be derived with reference to data including the noise map.

A photon counting processing program according to an example is a program causing a computer to perform a photon counting process based on digital values corresponding to a plurality of pixels which are output from a two-dimensional image sensor including the plurality of pixels, the photon counting process including: a first derivation process of deriving a provisional value of photon number in each pixel of the plurality of pixels based on the digital values; and a second derivation process of deriving a confirmed value of photon number in a target pixel which is one of the plurality of pixels based on a first probability and a second probability, wherein the first probability is an observation probability for each photoelectron number in the target pixel as the first probability based on a probability distribution of photoelectron number associated with a photon number distribution of light, and the second probability is an observation probability for each photoelectron number at the provisional value of the target pixel as the second probability based on a probability distribution of photoelectron number associated with reading noise of the target pixel.

Advantageous Effects of Invention

With the photon counting device and the photon counting method according to the aspects, it is possible to curb a decrease in counting accuracy of photons.

BRIEF DESCRIPTION OF DRAWINGS

FIG. 2 is a diagram schematically illustrating a pixel group of 3 rows×3 columns.

FIG. 25 is a diagram illustrating a result of photon counting according to an example.

FIG. 26 is a diagram illustrating a result of photon counting according to an example.

FIG. 27 is a diagram schematically illustrating another shape of neighboring pixels.

FIG. 30 is a diagram schematically illustrating another shape of neighboring pixels.

DESCRIPTION OF EMBODIMENTS

Hereinafter, an embodiment will be specifically described with reference to the accompanying drawings. For convenience, elements that are substantially the same will be referred to by the same reference signs and description thereof may be omitted. In the following description, photon counting includes both counting the number of photoelectrons generated in each pixel of an image sensor and counting the number of photons in consideration of quantum efficiency (QE) of the image sensor. This photon counting is also referred to as photon number resolving. In general, photon counting includes both detection of photoelectrons generated in each pixel of the image sensor and detection of photons incident on each pixel of the image sensor.

Figure 1:
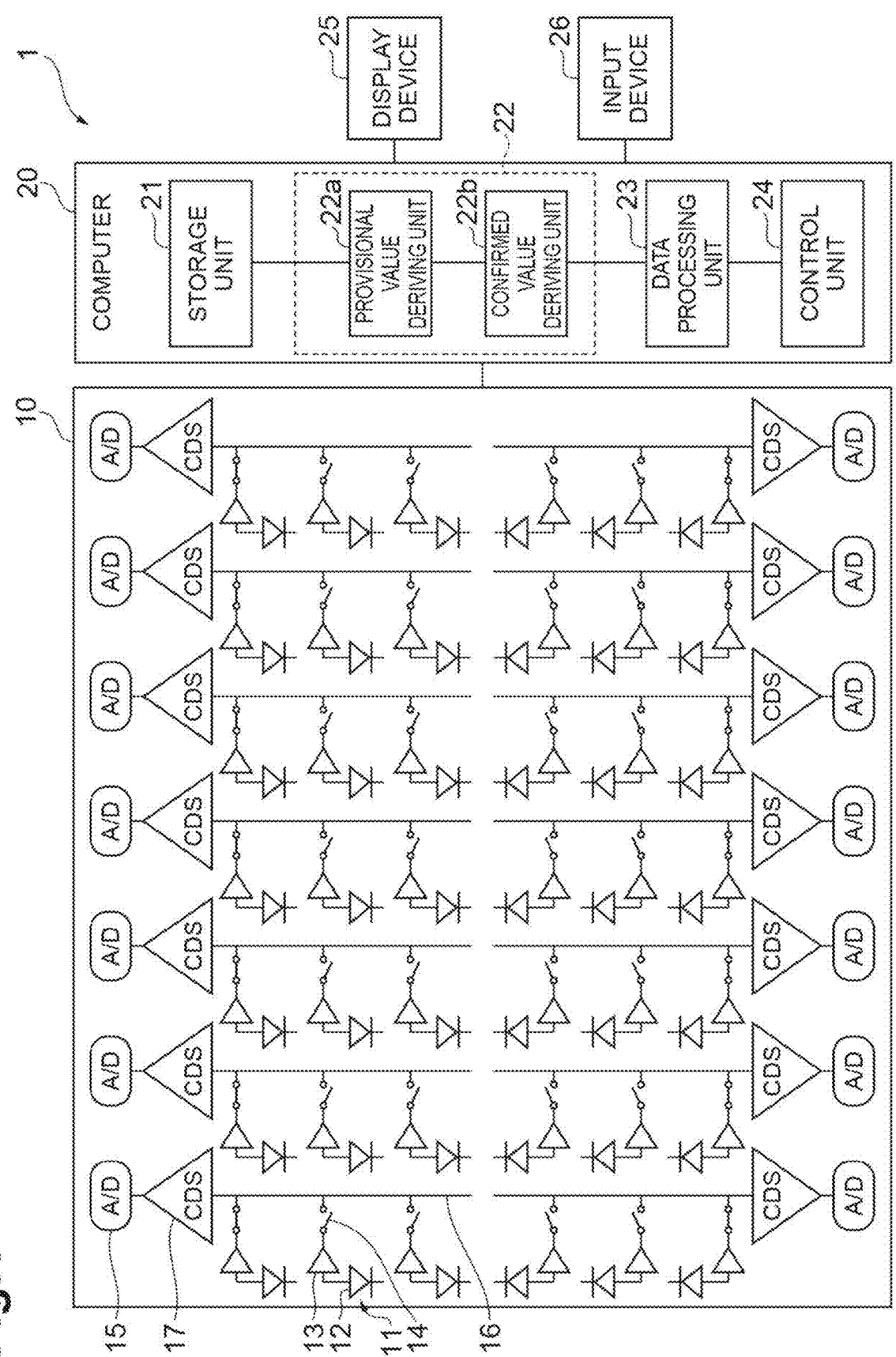
FIG. 1 is a diagram illustrating a configuration of a photon counting device according to an example.

FIG. 1 is a diagram illustrating a configuration of a photon counting device according to an example. As illustrated in FIG. 1, a photon counting device according to an example includes a CMOS image sensor 10 which is a two-dimensional image sensor and a computer (a control device) 20 connected to the CMOS image sensor 10. The CMOS image sensor 10 includes a plurality of pixels 11 and A/D converters 15. The plurality of pixels 11 are arranged two-dimensionally. That is, the plurality of pixels 11 are arranged in a row direction and a column direction. Each pixel 11 includes a photodiode (a photoelectric conversion element) 12 and an amplifier 13. The photodiode 12 accumulates photoelectrons generated in response to inputting of photons as charge. The amplifier 13 converts the charge accumulated in the photodiode 12 to a voltage and amplifies the converted voltage. The amplified voltage is transferred to a vertical signal line 16 for each line (for each row) by switching a selection switch 14 of the corresponding pixel 11. A correlated double sampling (CDS) circuit 17 is provided in each vertical signal line 16. The CDS circuit 17 removes uneven noise between pixels and temporarily stores the transferred voltage.

Each A/D converter 15 converts the voltage output from the amplifier 13 of each of the plurality of pixels 11 to a digital value. The A/D converter 15 may be provided in each pixel 11. In this embodiment, the A/D converter 15 converts the voltage stored in the CDS circuit 17 to a digital value. The converted digital values are output to the computer 20. For example, the digital values may be sent to a horizontal signal line which is not illustrated by switching for column selection and output to the computer 20. In this way, the CMOS image sensor 10 outputs a digital value corresponding to the number of input photons (the number of generated photoelectrons) to the computer 20 when photons are input to each pixel 11. When the voltage amplified by the amplifier 13 is read, reading noise which is random noise is generated in the amplifier 13.

The computer 20 physically includes a storage device such as a RAM and a ROM, a processor (an arithmetic operation circuit) such as a CPU and a GPU, and a communication interface. For example, a personal computer, a cloud server, a smart device (such as a smartphone or a tablet terminal), a microcomputer, or a field-programmable gate array (FPGA) can be used as the computer 20. The computer 20 serves as a storage unit 21, a conversion unit 22, a data processing unit 23, and a control unit 24 by causing the processor of a computer system to execute a program stored in the storage device. The computer 20 may be provided inside of a camera device including the CMOS image sensor 10 or may be provided outside of the camera device. A display device 25 and an input device 26 may be connected to the computer 20. The display device 25 is, for example, a display that can display a result of photon counting acquired by the computer 20. The input device 26 may be a keyboard, a mouse, or the like for allowing a user to input measurement conditions. The display device 25 and the input device 26 may be a touch screen. The display device 25 and the input device 26 may be included in the computer 20. The display device 25 and the input device 26 may be provided in the camera device including the CMOS image sensor 10.

The storage unit 21 stores data for converting a digital value output from the CMOS image sensor 10 to photon number. For example, the storage unit 21 stores a gain and an offset value in each of the plurality of pixels 11 as a lookup table. The storage unit 21 stores reading noise in each of the plurality of pixels 11 as a lookup table (a noise map).

A digital value [DN] output from the A/D converter 15 is expressed by Expression (1). Accordingly, the offset value [DN] is expressed as a digital value which is output in a state in which light is not incident. Therefore, for example, the offset values are acquired by acquiring a plurality of digital values based on the plurality of dark images acquired by the CMOS image sensor 10 in the state in which light is not incident and averaging the acquired digital values for each pixel 11. When the gain [DN/e] of each pixel 11 is acquired, a plurality of frame images are acquired by the CMOS image sensor 10 with sufficient light intensity. Then, an average optical signal value S [DN] and a standard deviation N [DN] of the digital values in each pixel 11 are acquired. Since the gain is expressed by $N^2/S$, the gain is derived based on the average optical signal values S and the standard deviation N.

$$\text{Digital value} = \text{gain} \times \text{number of electrons}[e] + \text{offset value} \quad \text{[Expression 1](1)}$$

The reading noise is defined, for example, as fluctuation of a digital value and can be expressed as a value converted to the unit of the number of electrons. Therefore, the reading noise for each pixel 11 may be acquired by acquiring the standard deviation of the digital values for each pixel 11 in a plurality of (for example, 100 frames or more) dark images and dividing the acquired standard deviation by the gain of the pixel 11. The offset value, the gain, and the reading noise for each pixel may be acquired in the course of manufacturing the photon counting device.

The conversion unit 22 converts the digital value for each of the plurality of pixels 11 output from the A/D converter 15 to photon number (photoelectron number) with reference to a table stored in the storage unit 21. For example, the photoelectron can be acquired by dividing the number of photoelectrons for each pixel 11 by quantum efficiency. When the quantum efficiency is 100%, the photoelectron number and the photon number are the same.

The data processing unit 23 prepares a two-dimensional image indicating photon number in each pixel 11 based on photon number output from the conversion unit 22. For example, the two-dimensional image may be an image in which the pixels are imaged by luminance values corresponding to photon number. The prepared two-dimensional image can be output to the display device 25. The data processing unit 23 may prepare a histogram which is a plot of the number of pixels with respect to photon number. The control unit 24 can comprehensively control the functional units of the computer 20 or the CMOS image sensor 10.

The conversion unit 22 will be described below in detail. In description of the conversion unit 22, a pixel group in which pixels are arranged in 3 rows×3 columns may be referred to as a partial area of an image sensor including a plurality of pixels. FIG. 2 is a diagram schematically illustrating a pixel group in which pixels are arranged in 3 rows×3 columns. In FIG. 2, reading noise corresponding to each pixel 11 of the pixel group is indicated by a reference sign "$R_i$" (where i indicates a position of the corresponding pixel). The conversion unit 22 can appropriately refer to the gain, the offset value, and the reading noise of each pixel 11 with reference to a lookup table stored in the storage unit 21.

The conversion unit 22 in the example includes a provisional value deriving unit 22a (a first derivation unit) and a confirmed value deriving unit 22b (a second derivation unit). The provisional value deriving unit 22a derives a provisional value of photon number in each pixel 11 of the plurality of pixels 11 based on a digital value. The provisional value deriving unit 22a may derive the number of photoelectrons acquired by dividing a value obtained by subtracting the offset value from the measured digital value by the gain as the provisional value of photon number (a first provisional value) for each pixel 11 as represented by Expression (2). In the following description, the first provisional value may be referred to as a pixel value.

[Expression 2]

$$\text{Pixel value} = ((\text{digital value} - \text{offset value})/\text{gain}) \quad (2)$$

The provisional value deriving unit 22a may derive an integer value of photon number estimated from the pixel value as a provisional value (a second provisional value). In the following description, the second provisional value may be referred to as a provisional photon number. For example, the provisional photon number may be acquired by rounding off the pixel value to the nearest whole number. In this case, the pixel value may be converted to a provisional photon number by setting a predetermined threshold value range for the pixel value. For example, the threshold value range corresponding to 5 photoelectrons is equal to or greater than 4.5 e and less than 5.5 e. In FIG. 2, the provisional value (for example, the provisional photon number) in each pixel 11 of the pixel group is indicated by a reference sign "$k_i$" (where i indicates a position of the corresponding pixel).

The confirmed value deriving unit 22b derives (determines) a confirmed value of photon number in each of the plurality of pixels 11. For example, the confirmed value deriving unit 22b derives the confirmed value of photon number in a target pixel which is one of the plurality of pixels 11. By setting each of the plurality of pixels in the two-dimensional image sensor as the target pixel, the confirmed values of photon number in all the pixels are derived.

In this embodiment, the confirmed value deriving unit 22b derives a first probability and a second probability and derives the confirmed value of photon number in the target pixel based on the derived first probability and the derived second probability. The first probability is an observation probability for each photoelectron number in the target pixel based on a probability distribution of photoelectron number associated with the photon number distribution of light and is expressed by Expression (3). As represented by Expression (3), the first probability in the example is based on the probability distribution of photoelectron number associated with optical shot noise and is based on a Poisson distribution.

[Expression 3]

$$\text{First probability} = \frac{\lambda^k \exp(-\lambda)}{k!} \quad (3)$$

In Expression (3), k denotes a photon number, and λ denotes an average photon number. That is, the first probability is a probability with which the photon number in the target pixel when the average photon number in the target pixel is λ is observed to be k (an observation probability) and is calculated for each photoelectron number. The photon number k is a provisional photon number which is assumed by the confirmed value deriving unit 22b. That is, the photon number k can be said to be a provisional value of the photon number (a third provisional value) in the target pixel. In the following description, the third provisional value may be referred to as an assumed photon number.

The average photon number (an average value) may be an average of the provisional values in neighboring pixels. The neighboring pixels can include two or more pixels included in a partial area near the target pixel out of the plurality of pixels. In the example of the pixel group in which pixels are arranged in 3 rows×3 columns illustrated in FIG. 2, a central pixel 11c may be defined as a target pixel and the pixel group in which pixels are arranged in 3 rows×3 columns may be defined as the neighboring pixels. In this case, the average photon number in the target pixel may be an average value of the provisional values of the pixels 11 constituting the neighboring pixels. The confirmed value of the target pixel out of the neighboring pixels may be an assumed photon number. That is, in FIG. 2, $k_0$ may be an assumed photon number when the average photon number of the pixel 11c is derived. The provisional values of the pixels other than the target pixel out of the neighboring pixels may be one of the pixel value and the provisional photon number. Any of the pixel value and the provisional photon number may be used as the provisional value of the target pixel instead of the assumed photon number.

For example, the confirmed value deriving unit 22b may calculate a weighted average including reading noise of the neighboring pixels as a weighting as the average photon number with reference to a noise map indicating the reading noise in each of the plurality of pixels 11. A weight $W_i$ (where i indicates a position of the corresponding pixel) based on the reading noise is expressed, for example, by Expression (4). That is, the weight $W_i$ in the example may be a power of a reciprocal of the reading noise $R_i$. In this case, the provisional value is more likely to be reflected in the average photon number as the reading noise of a pixel becomes lower, and the provisional value is less likely to be reflected in the average photon number as the reading noise of a pixel becomes higher. In Expression (4), a reliability $\alpha$ can increase or decrease an influence of the reading noise on the weight $W_i$. That is, the influence of the reading noise on the weight $W_i$ becomes larger as the reliability $\alpha$ becomes larger. For example, $\alpha > 0$ is satisfied. When the value of the reliability $\alpha$ is excessively large, it is conceivable that a correct confirmed value not be derived. Therefore, for example, the reliability $\alpha$ may be less than 20. The reliability $\alpha$ may have a value which is set in advance by the confirmed value deriving unit 22b or may have a value which can be set by a user of the photon counting device 1.

[Expression 4]

$$w_i = \left(\frac{1}{R_i}\right)^\alpha \quad (4)$$

The average photon number $\lambda$ based on the weighted average is expressed by Expression (5).

[Expression 5]

$$\lambda = \frac{\Sigma_i w_i \times k_i}{\Sigma_i w_i} \quad (5)$$

The second probability is an observation probability for each photoelectron number at the provisional value in the target pixel based on the probability distribution of the photoelectron number associated with the reading noise in the target pixel and is expressed by Expression (6). The provisional value of the target pixel may be a pixel value. As represented by Expression (6), the second probability confirms to a normal distribution (a Gaussian distribution). In Expression (6), x denotes a pixel value [e] of the target pixel, and R denotes the reading noise [e-rms] of the target pixel. That is, the second probability is a probability (an observation probability) with which the photon number in the target pixel is observed to be k at the provisional value (for example, the pixel value) of the target pixel and is calculated for each photoelectron number.

[Expression 6]

$$\text{Second probability} = \frac{1}{\sqrt{2\pi}R}\exp\left(-\frac{(x-k)^2}{2R^2}\right) \quad (6)$$

The confirmed value deriving unit 22b calculates a probability for each photoelectron number when the target pixel indicates the provisional value based on a product of the first probability and the second probability and determines the confirmed value of the photon number based on the calculated probability. That is, the confirmed value deriving unit 22b in the example calculates a probability for each assumed photon number when the target pixel indicates the provisional value based on Expression (7) while changing the assumed photon number of the target pixel and outputs a value of the assumed photon number at the highest probability as the confirmed value of the photon number. A range of the assumed photon number calculated by the confirmed value deriving unit 22b may be determined based on the provisional value and the average photon number of the target pixel. For example, the range of the assumed photon number may be a minimum range including the provisional value and the average photon number of the target pixel. In this case, the average photon number may be calculated regardless of the provisional value of the target pixel. For example, the range of the assumed photon number may be a range from 0 to a maximum value of the provisional value in the neighboring pixels.

[Expression 7]

$$P(k \mid x) = \frac{\lambda^k \exp(-\lambda)}{k!} \times \frac{1}{\sqrt{2\pi}R}\exp\left(-\frac{(x-k)^2}{2R^2}\right) \quad (7)$$

For example, Expression (7) may be modified as follows for the purpose of easier arithmetic. That is, Expression (8) is derived by taking log of both sides of Expression (7).

[Expression 8]

$$\log P(k \mid x) = k \log \lambda - \log k! - \lambda - \frac{(x-k)^2}{2R^2} - \log\sqrt{2\pi}R \quad (8)$$

Since only the term technique related to the photon number in Expression (8) is necessary, Expression (8) may be approximated by Expression (9). The confirmed value deriving unit 22b in the example can derive the confirmed value of the photon number based on Expression (9).

[Expression 9]

$$\log P(k \mid x) \cong k \log \lambda - \log k! - \lambda - \frac{(x-k)^2}{2R^2} \quad (9)$$

Figure 3:
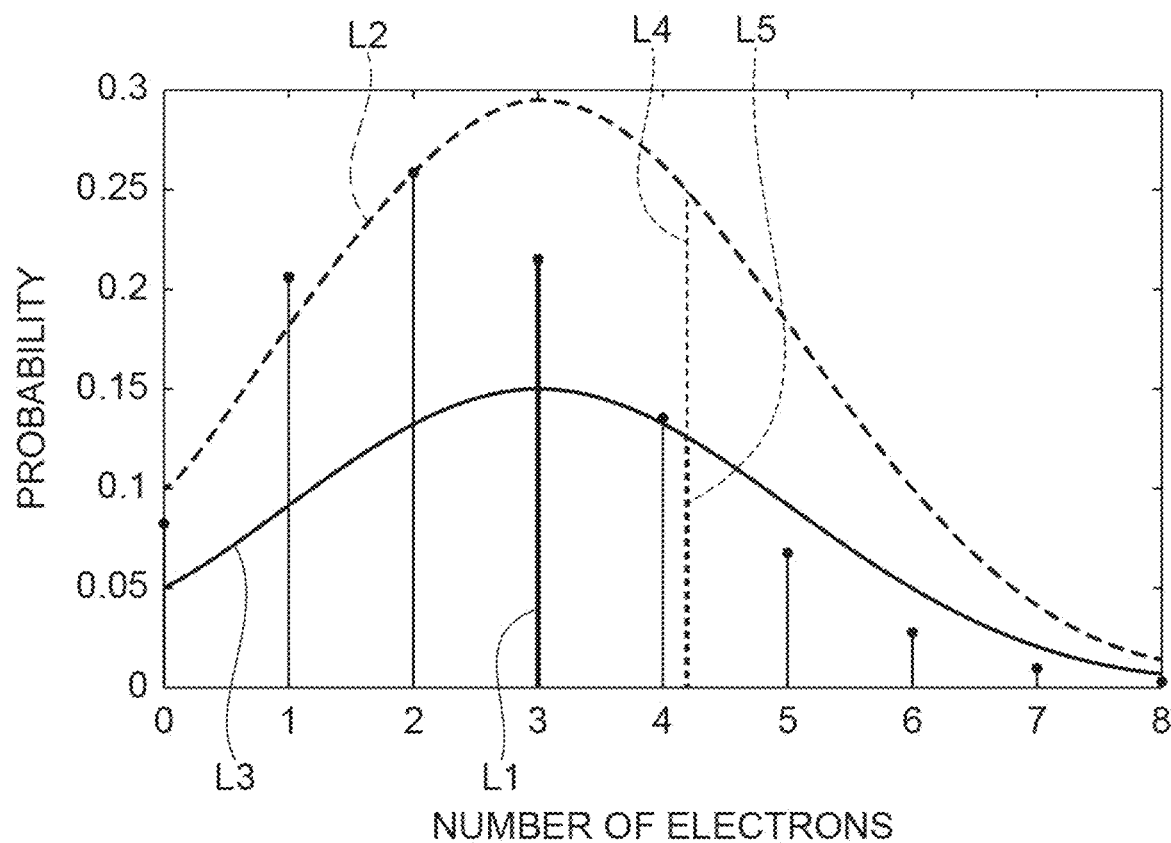
FIG. 3 is a diagram illustrating a probability distribution of photoelectron number.

FIG. 3 is a diagram illustrating a probability distribution of photoelectron number. In FIG. 3, the probability distribution of the photoelectron number when the pixel value of the target pixel is 4.2 [e] and the average photon number of the target pixel is 2.5 photons is illustrated. In FIG. 3, the first probability when the assumed photon number is 3 photons is indicated by a bold line L1, and the second probability when the assumed photon number is 3 photons is indicated by a dotted line L2. The probability distribution of the product of the first probability and the second probability when the assumed photon number is 3 photons is indicated by a solid line L3. Since the second probability when the assumed photon number is 3 photons and the pixel value is 4.2 [e] is indicated by a dotted line L4, the product of the first probability and the second probability, that is P(3|4.2), when the assumed photon number is 3 photons and the pixel value is 4.2 [e] is indicated by a dotted line L5.

As described above, the confirmed value deriving unit 22b derives the photon number which is most probable in the target pixel as the confirmed value of the target pixel using the provisional values of the neighboring pixels as a clue. The confirmed value deriving unit 22b will be described below in more detail using specific numerical values. Now, three examples including an example in which the reading noise of the target pixel is large, an example in which the reading noise of the target pixel is small, and an example in which a light intensity on the two-dimensional image sensor is high will be described. In the example, a pixel group in which pixels are arranged in 3 rows×3 columns is described as the neighboring pixels, and it is assumed that the neighboring pixels are arranged in 1 row×3 columns for the purpose of simplification of explanation. In this case, a central pixel is the target pixel.

Figure 4:
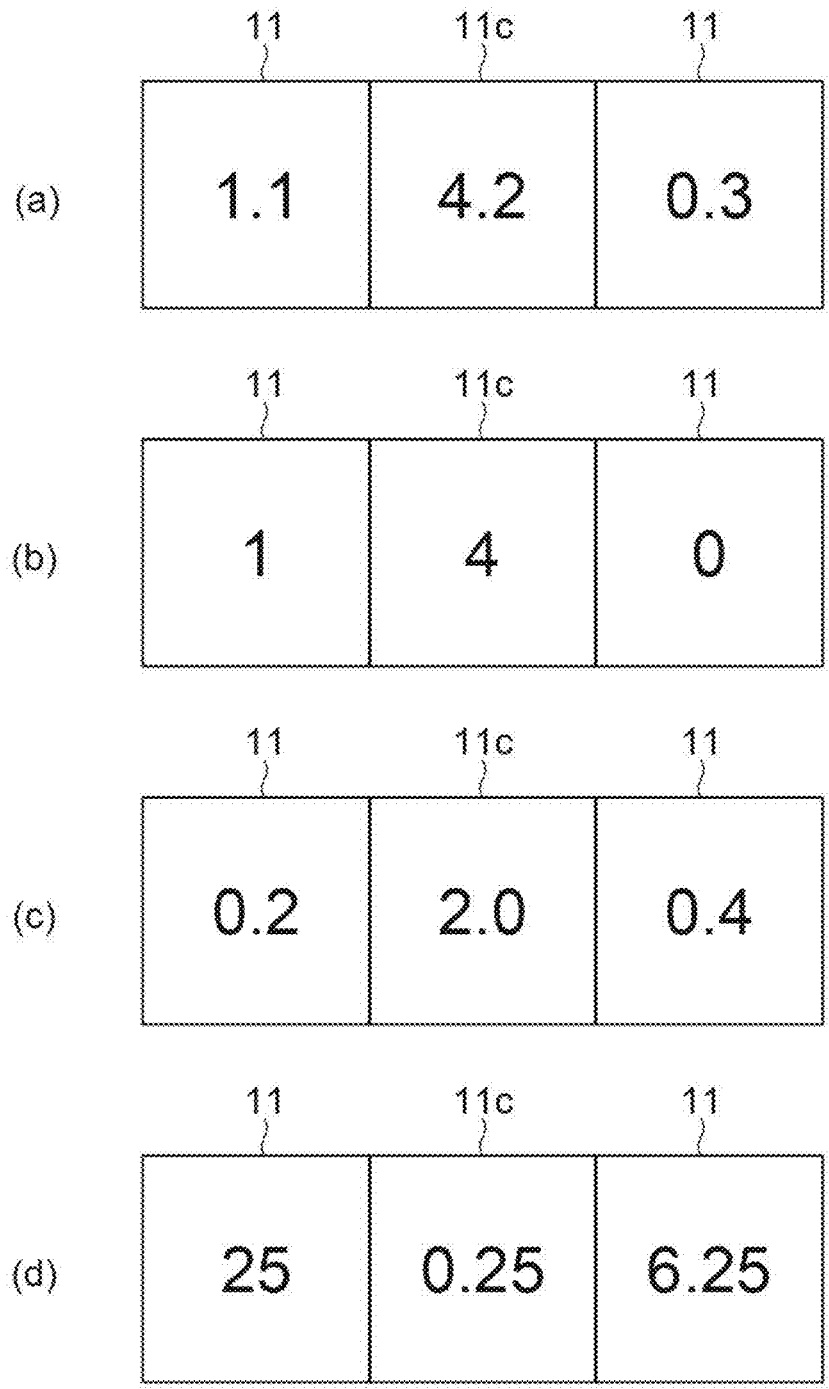
FIG. 4 is a diagram schematically illustrating a confirmed value deriving unit.

FIG. 4 illustrates an example in which the reading noise of the target pixel is large. (a) of FIG. 4 illustrates the pixel value [e] of each pixel 11. (b) of FIG. 4 illustrates the provisional photon number of each pixel 11. (c) of FIG. 4 illustrates the reading noise of each pixel 11. (d) of FIG. 4 illustrates the weight of each pixel 11 in a weighted average. In the example illustrated in FIG. 4, the pixels values [e] of three pixels 11 are derived as "1.1," "4.2," and "0.3," and the provisional photon number of the three pixels are derived as "1," "4," and "0." The reading noise [e-rms] of the three pixels is "0.2," "2.0," and "0.4." In the illustrated example, the reliability $\alpha$ is "2," and the weights of the three pixels are "25," "0.25," and "6.25."

Figure 5:
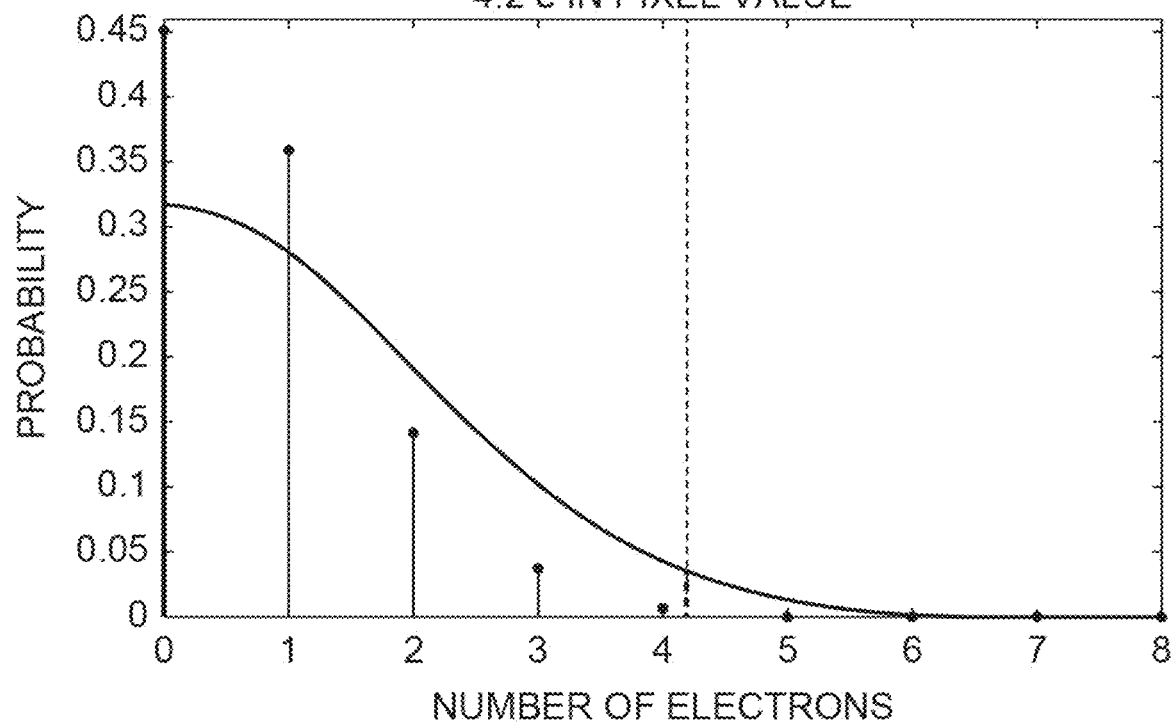
FIG. 5 is a diagram illustrating a probability distribution of photoelectron number.

The confirmed value deriving unit 22b derives a probability with which the assumed photon number when the pixel value is 4.2 [e] based on Expression (9) while changing the assumed photon number is achieved. FIGS. 5 to 9 are diagrams illustrating the probability of the photoelectron number in the example illustrated in FIG. 4. In FIGS. 5 to 9, the Poisson distribution corresponding to the average photon number is illustrated and $P(k|x)$ corresponding to the assumed photon number k is illustrated. FIG. 5 is a diagram illustrating the probability of the photoelectron number when the assumed photon number is "0." In the example illustrated in FIG. 5, since the assumed photon number is "0," the average photon number of the target pixel is about 0.79 [e]. In FIG. 5, the probability with which the assumed photon number is "0" when the pixel value is 4.2 appears at the position of the photoelectron number of 4.2 [e].

Figure 6:
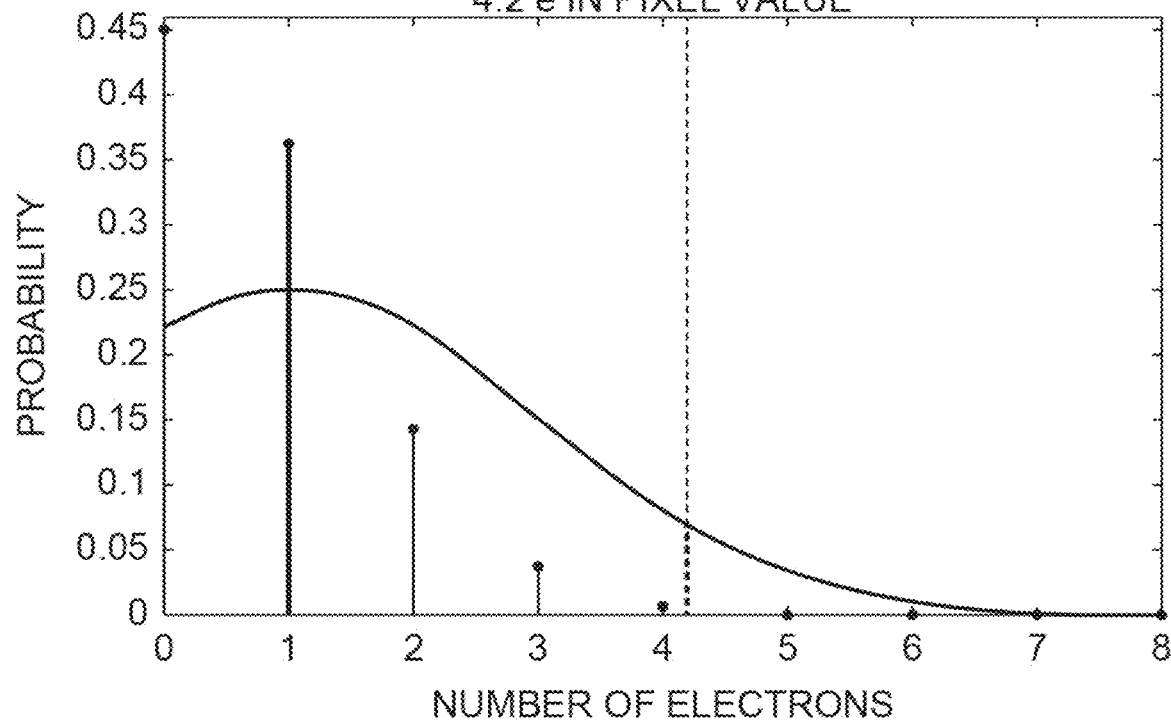
FIG. 6 is a diagram illustrating a probability distribution of photoelectron number.
Figure 7:
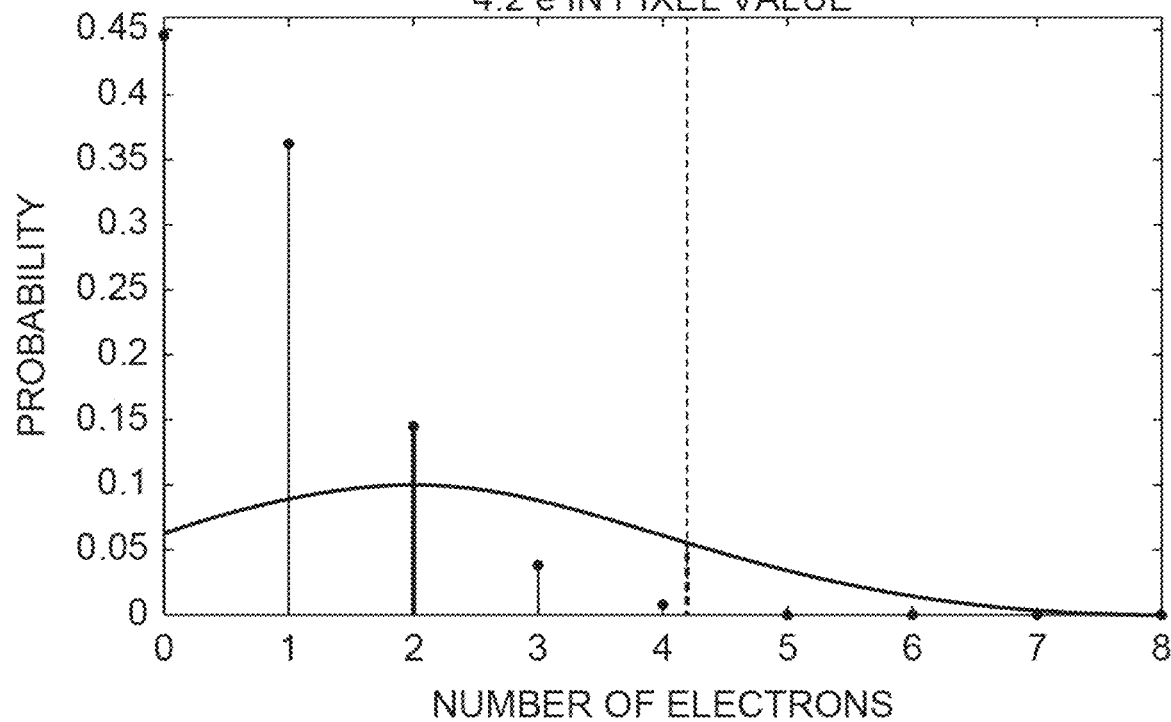
FIG. 7 is a diagram illustrating a probability distribution of photoelectron number.
Figure 8:
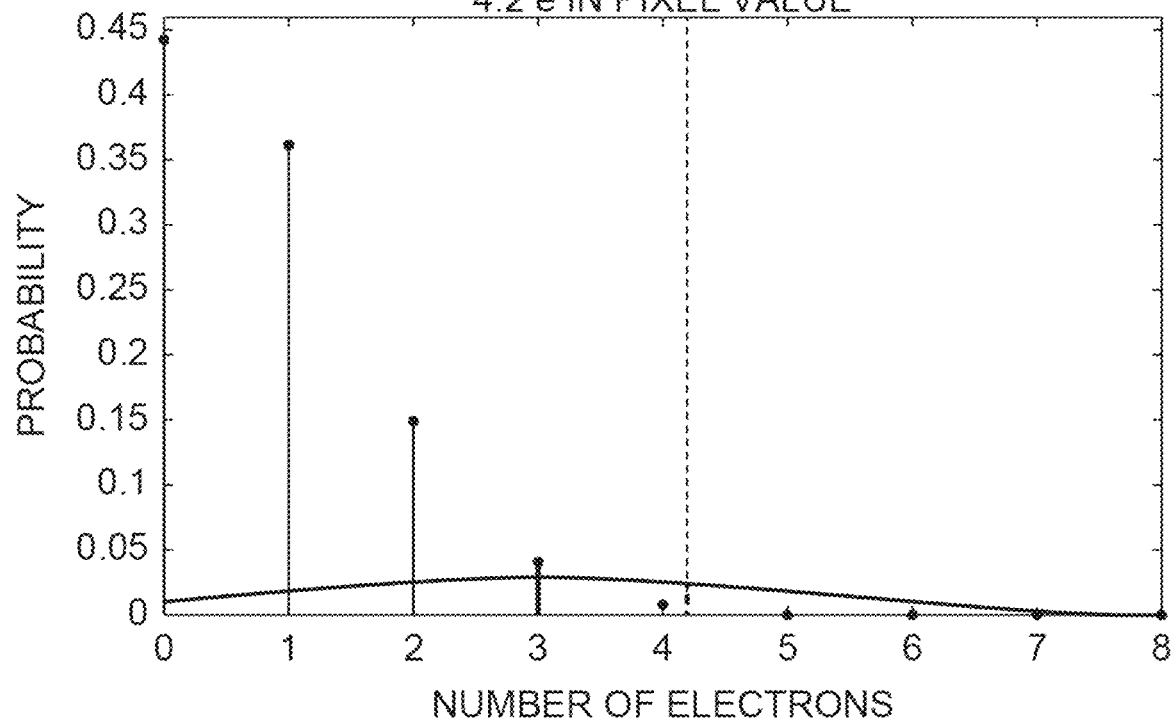
FIG. 8 is a diagram illustrating a probability distribution of photoelectron number.
Figure 9:
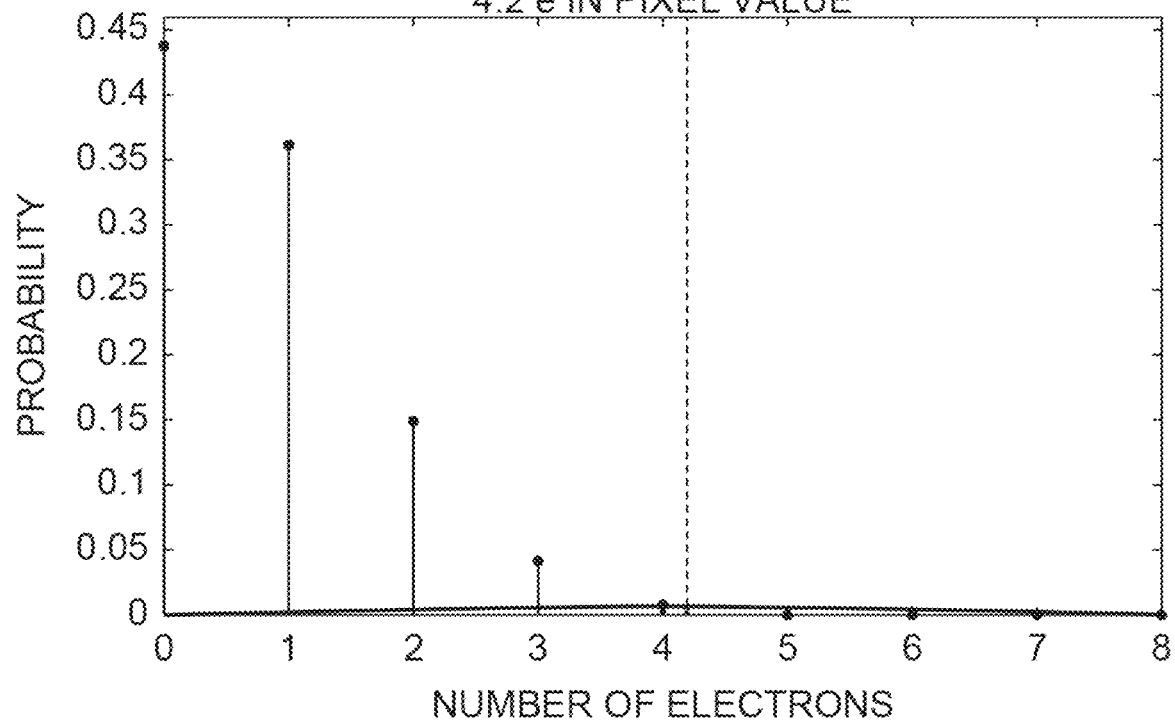
FIG. 9 is a diagram illustrating a probability distribution of photoelectron number.

Similarly, FIG. 6 is a diagram illustrating the probability of the photoelectron number when the assumed photon number is "1." In the example illustrated in FIG. 6, since the assumed photon number is "1," the average photon number of the target pixel is about 0.80. In FIG. 6, the probability with which the assumed photon number is "1" when the pixel value is 4.2 appears at the position of the photoelectron number of 4.2 [e]. FIG. 7 is a diagram illustrating the probability of the photoelectron number when the assumed photon number is "2." In the example illustrated in FIG. 7, since the assumed photon number is "2," the average photon number of the target pixel is about 0.81. In FIG. 7, the probability with which the assumed photon number is "2" when the pixel value is 4.2 appears at the position of the photoelectron number of 4.2 [e]. FIG. 8 is a diagram illustrating the probability of the photoelectron number when the assumed photon number is "3." In the example illustrated in FIG. 8, since the assumed photon number is "3," the average photon number of the target pixel is about 0.82. In FIG. 8, the probability with which the assumed photon number is "3" when the pixel value is 4.2 appears at the position of the photoelectron number of 4.2 [e]. FIG. 9 is a diagram illustrating the probability of the photoelectron number when the assumed photon number is "4." In the example illustrated in FIG. 9, since the assumed photon number is "4," the average photon number of the target pixel is about 0.83. In FIG. 9, the probability with which the assumed photon number is "4" when the pixel value is 4.2 appears at the position of the photoelectron number of 4.2 [e].

Figure 10:
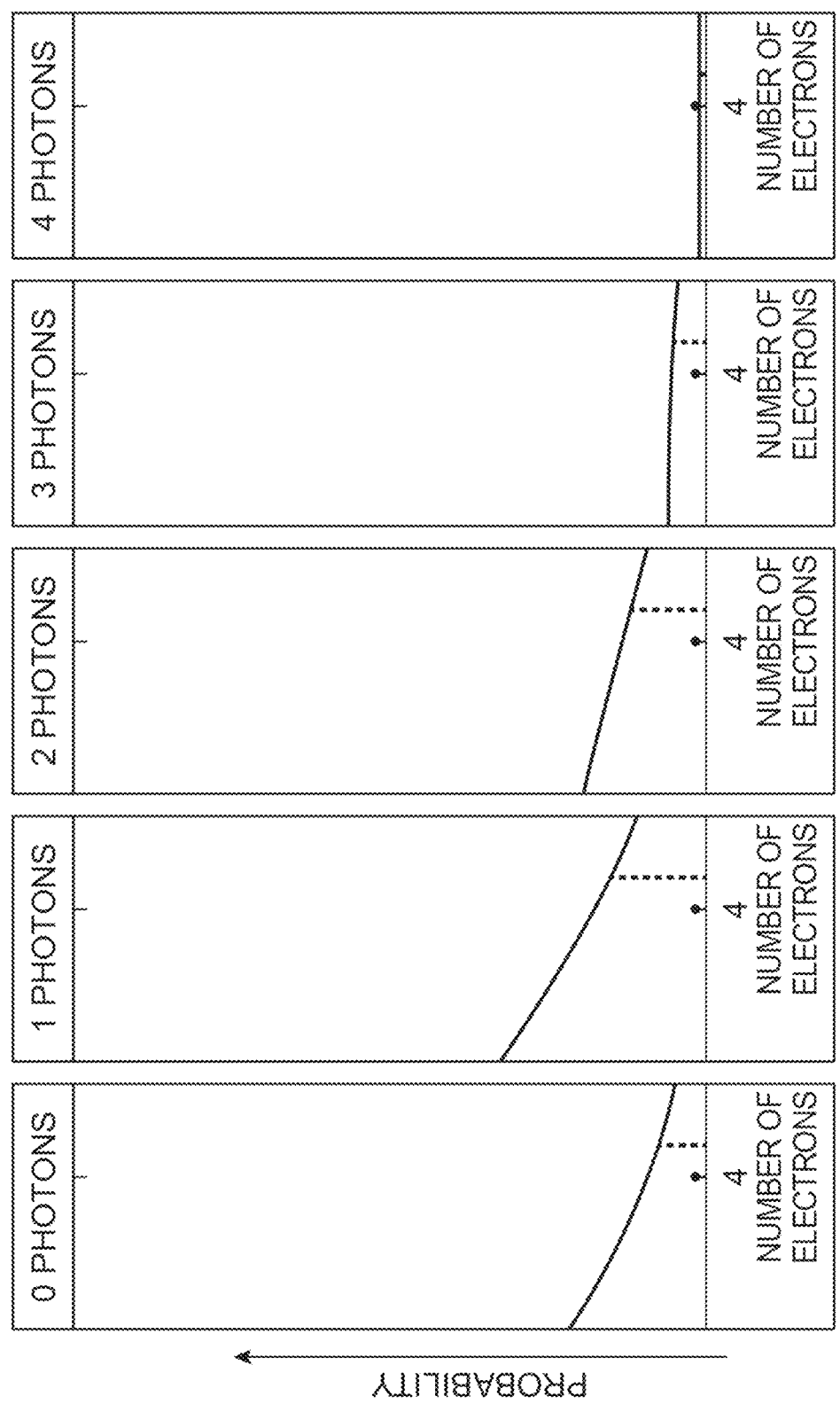
FIG. 10 is a diagram illustrating a result of comparison of probabilities in FIGS. 5 to 9.

FIG. 10 is an enlarged view of the position of the photoelectron number of 4.2 [e] in FIGS. 5 to 9 for the purpose of comparison. As illustrated in FIG. 10, in the example illustrated in FIG. 4, the probability when the assumed photon number is "1" is the highest. The confirmed value deriving unit 22b in the example compares the probabilities based on the result of calculation using Expression (9) and derives 1 [e] as the confirmed value of the photon number of the target pixel.

Figure 11:
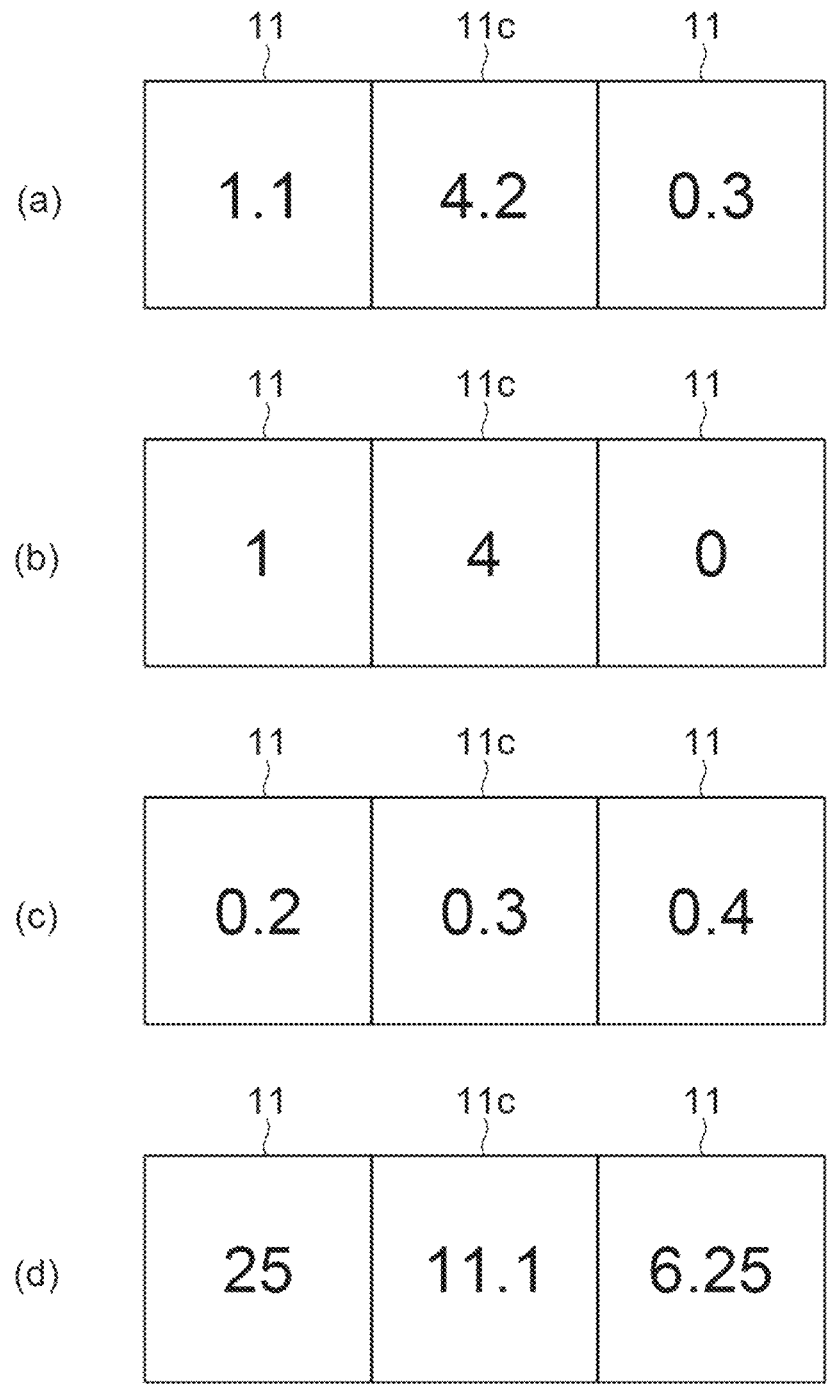
FIG. 11 is a diagram schematically illustrating a confirmed value deriving unit.

FIG. 11 illustrates an example in which the reading noise of the target pixel is small. (a) of FIG. 11 illustrates the pixel value [e] of each pixel 11. (b) of FIG. 11 illustrates the provisional photon number of each pixel 11. (c) of FIG. 11 illustrates the reading noise [e-rms] of each pixel 11. (d) of FIG. 11 illustrates the weight of each pixel 11 in a weighted average. In the example illustrated in FIG. 11, the pixels values [e] of three pixels 11 are derived as "1.1," "4.2," and "0.3," and the provisional photon number of the three pixels are derived as "1," "4," and "0." The reading noise [e-rms] of the three pixels is "0.2," "0.3," and "0.4." In the illustrated example, the reliability $\alpha$ is "2," and the weights of the three pixels are "25," "11.1," and "6.25."

Figure 12:
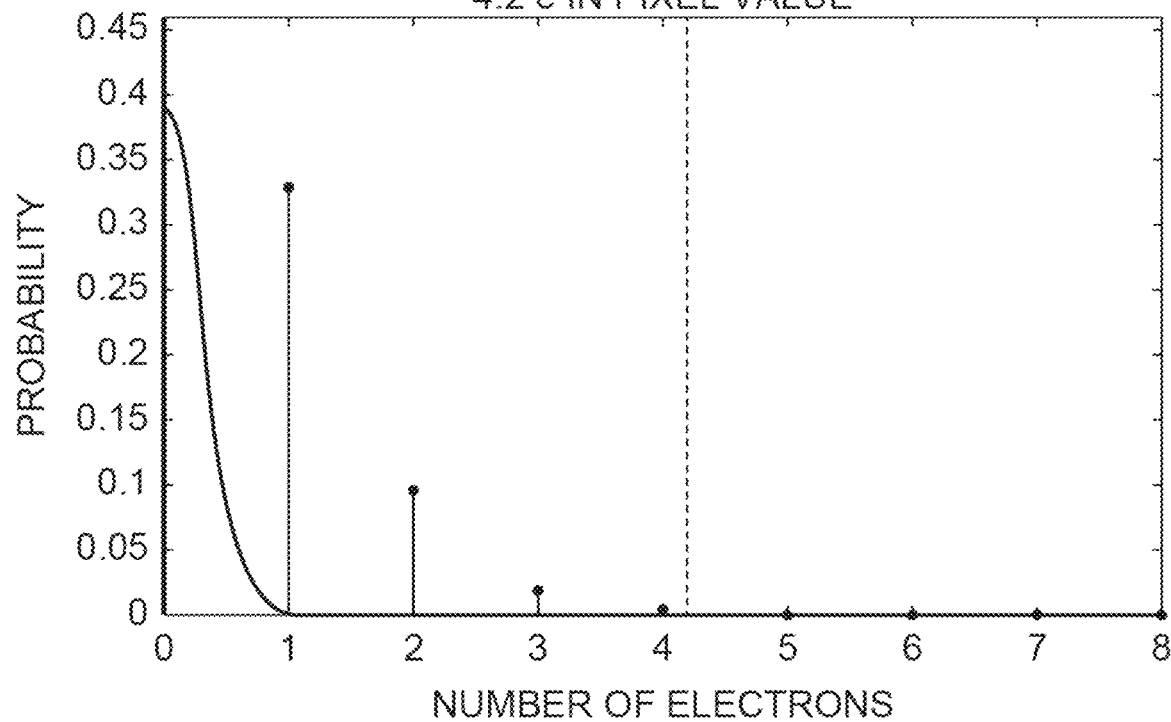
FIG. 12 is a diagram illustrating a probability distribution of photoelectron number.

The confirmed value deriving unit 22b derives a probability with which the assumed photon number when the pixel value is 4.2 [e] based on Expression (9) while changing the assumed photon number is achieved. FIGS. 12 to 16 are diagrams illustrating the probability of the photoelectron number in the example illustrated in FIG. 11. In FIGS. 12 to 16, the Poisson distribution corresponding to the average photon number is illustrated and $P(k_0|x)$ corresponding to the assumed photon number is illustrated. In the example illustrated in FIG. 12, since the assumed photon number is "0," the average photon number of the target pixel is about 0.59. In FIG. 12, the probability with which the assumed photon number is "0" when the pixel value is 4.2 is illustrated. In FIG. 12, the probability with which the assumed photon number is "0" when the pixel value is 4.2 appears at the position of the photoelectron number of 4.2 [e].

Figure 13:
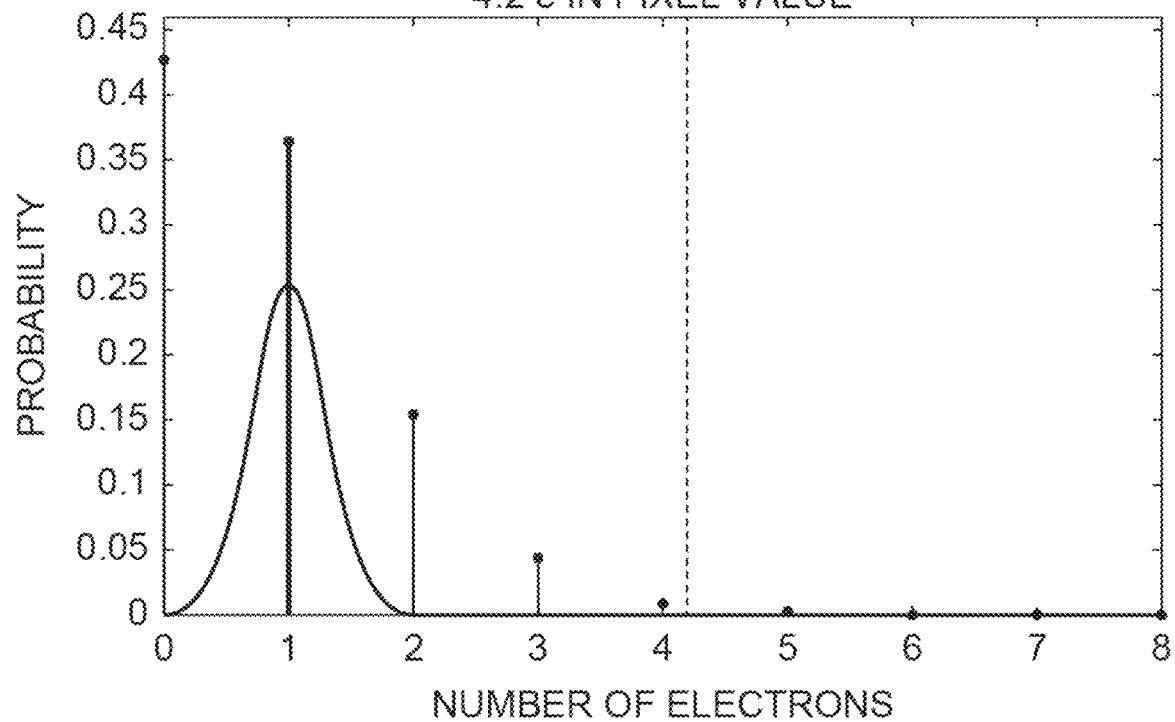
FIG. 13 is a diagram illustrating a probability distribution of photoelectron number.
Figure 14:
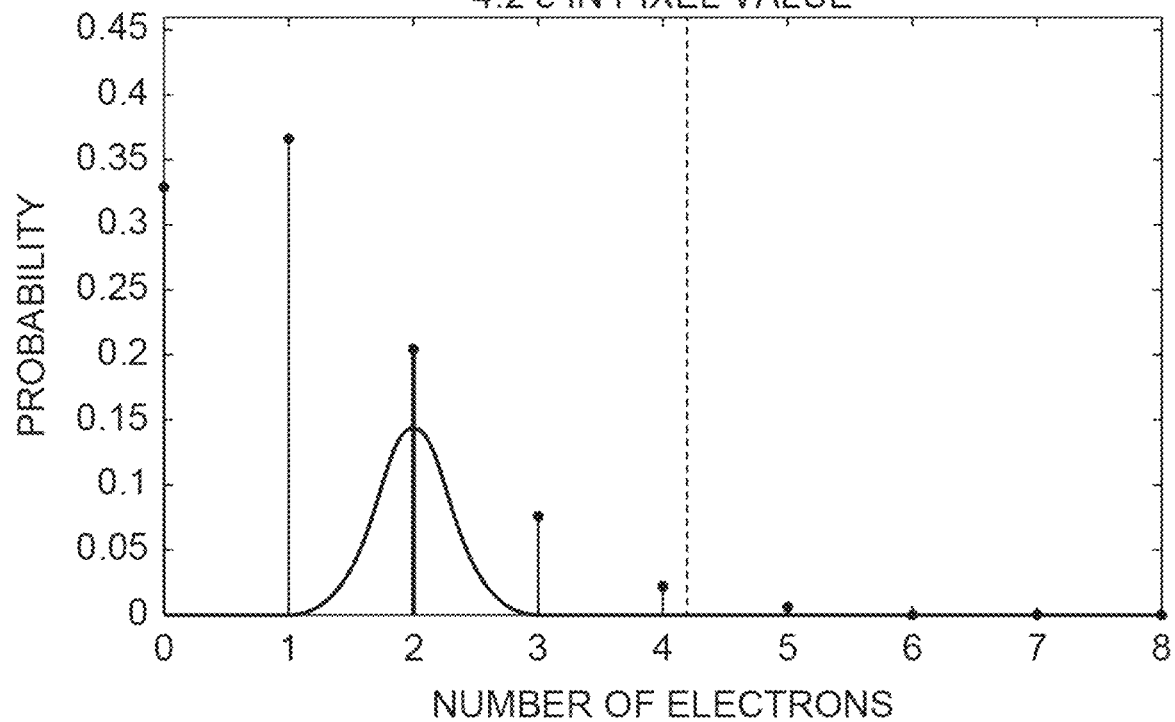
FIG. 14 is a diagram illustrating a probability distribution of photoelectron number.
Figure 15:
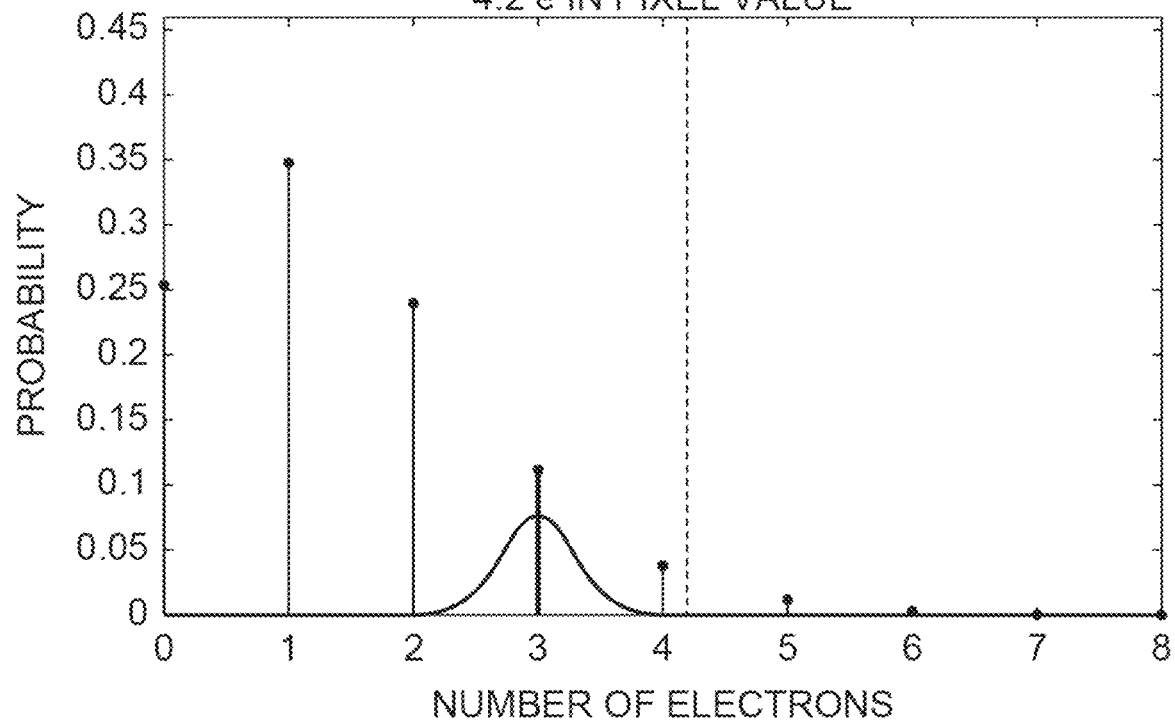
FIG. 15 is a diagram illustrating a probability distribution of photoelectron number.

Similarly, FIG. 13 is a diagram illustrating the probability of the photoelectron number when the assumed photon number is "1." In the example illustrated in FIG. 13, since the assumed photon number is "1," the average photon number of the target pixel is about 0.85. In FIG. 13, the probability with which the assumed photon number is "1" when the pixel value is 4.2 appears at the position of the photoelectron number of 4.2 [e]. FIG. 14 is a diagram illustrating the probability of the photoelectron number when the assumed photon number is "2." In the example illustrated in FIG. 14, since the assumed photon number is "2," the average photon number of the target pixel is about 1.11. In FIG. 14, the probability with which the assumed photon number is "2" when the pixel value is 4.2 appears at the position of the photoelectron number of 4.2 [e]. FIG. 15 is a diagram illustrating the probability of the photoelectron number when the assumed photon number is "3." In the example illustrated in FIG. 15, since the assumed photon number is "3," the average photon number of the target pixel is about 1.38. In FIG. 15, the probability with which the assumed photon number is "3" when the pixel value is 4.2 appears at the position of the photoelectron number of 4.2

Figure 16:
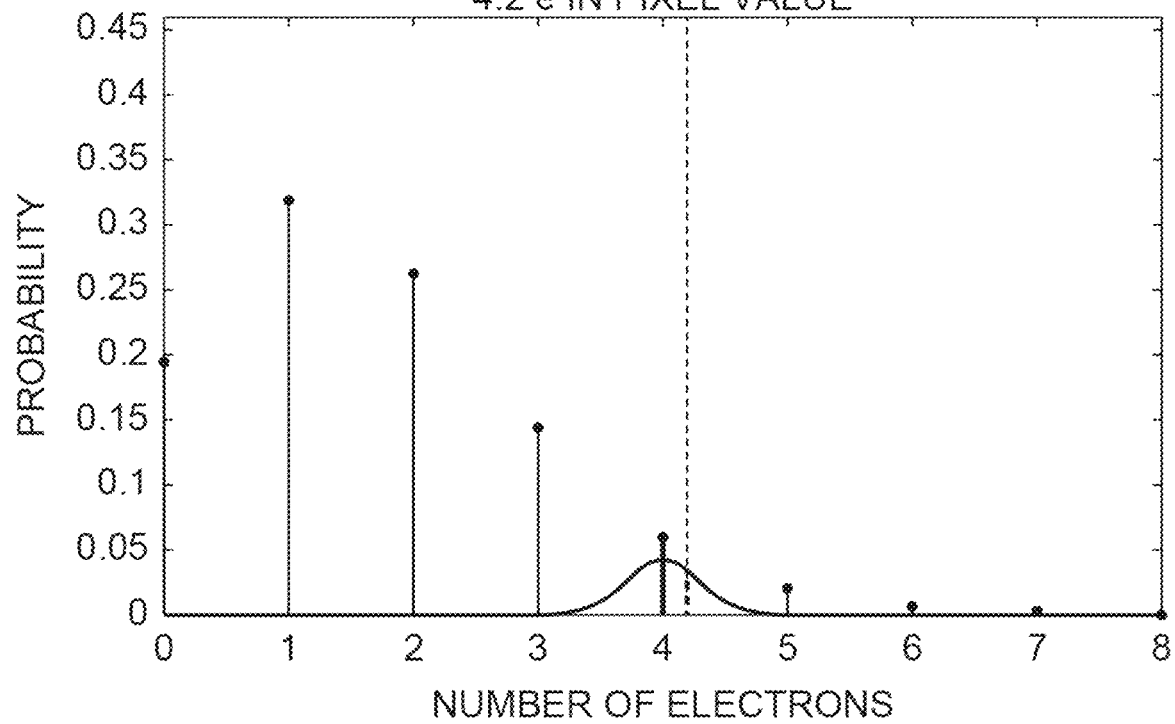
FIG. 16 is a diagram illustrating a probability distribution of photoelectron number.

[e]. FIG. 16 is a diagram illustrating the probability of the photoelectron number when the assumed photon number is "4." In the example illustrated in FIG. 16, since the assumed photon number is "4," the average photon number of the target pixel is about 1.64. In FIG. 16, the probability with which the assumed photon number is "4" when the pixel value is 4.2 appears at the position of the photoelectron number of 4.2 [e].

As illustrated in FIGS. 12 to 16, the probability when the assumed photon number is "4" which is the same as the provisional photon number is higher than the probability when the assumed photon number is another assumed photon number. In the illustrated examples, the probabilities of assumed photon number other than "4" are almost zero. Accordingly, the confirmed value deriving unit 22b derives "4" as the confirmed value of the photon number of the target pixel.

Figure 17:
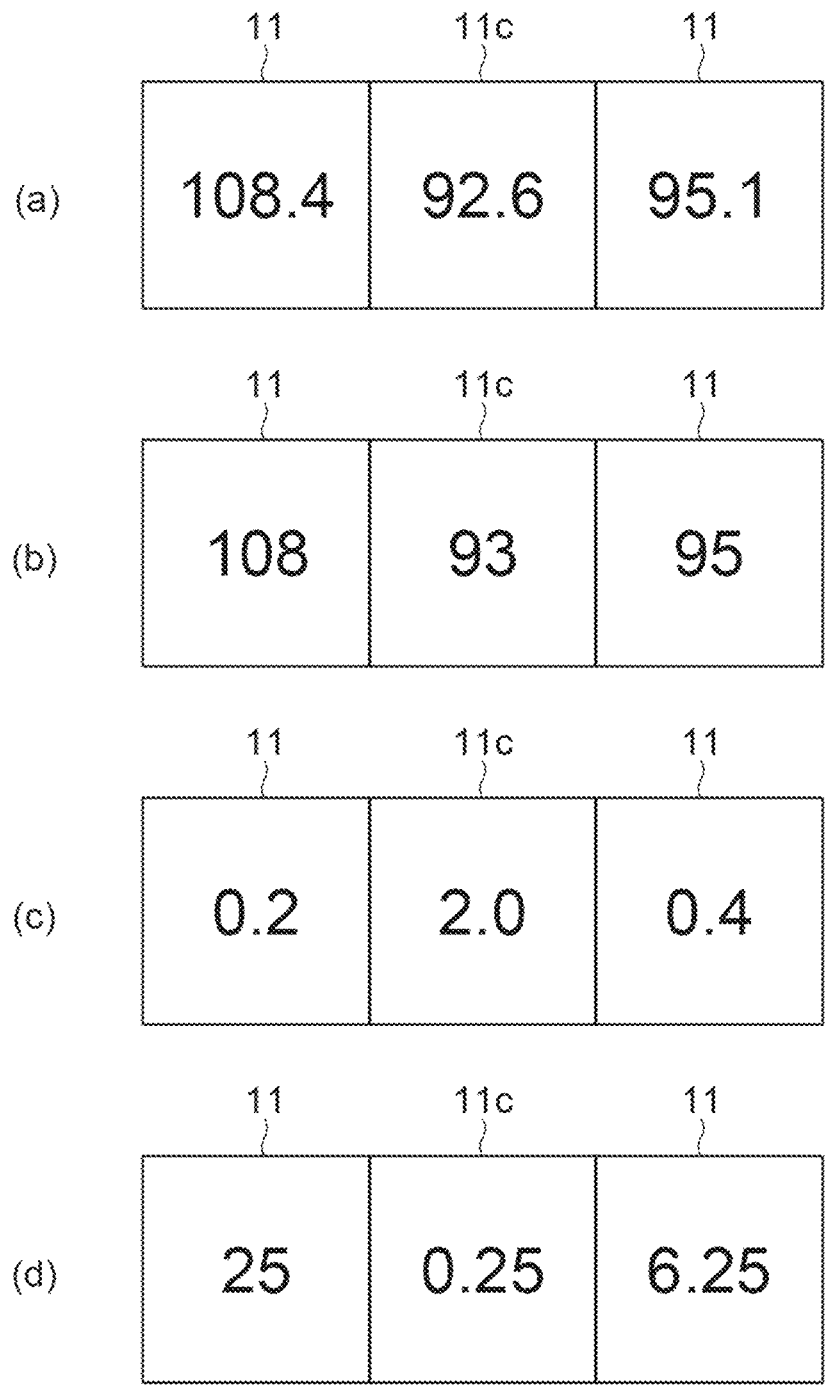
FIG. 17 is a diagram schematically illustrating a confirmed value deriving unit.

FIG. 17 illustrates an example in which the light intensity on the two-dimensional image sensor is high. (a) of FIG. 17 illustrates the pixel value of each pixel. (b) of FIG. 17 illustrates the provisional photon number of each pixel. (c) of FIG. 17 illustrates the reading noise of each pixel. (d) of FIG. 17 illustrates the weight of each pixel in a weighted average. In the example illustrated in FIG. 17, the pixels values of three pixels 11 are derived as "108.4," "92.6," and "95.1," and the provisional photon number of the three pixels are derived as "108," "93," and "95." The reading noise of the three pixels is "0.2," "2.0," and "0.4." In the illustrated example, the reliability α is "2," and the weights of the three pixels are "25," "0.25," and "6.25."

Figure 18:
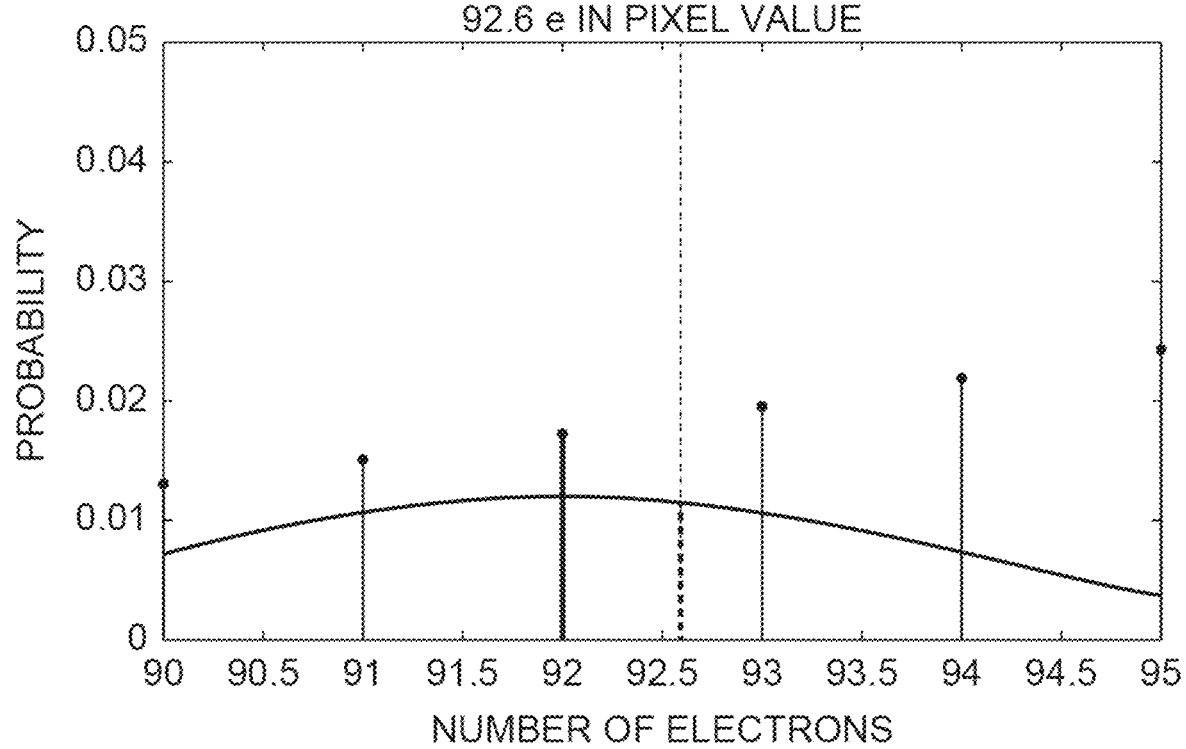
FIG. 18 is a diagram illustrating a probability distribution of photoelectron number.

The confirmed value deriving unit 22b derives a probability with which the assumed photon number when the pixel value is 4.2 based on the expression described above while changing the assumed photon number is achieved. FIGS. 18 to 21 are diagrams illustrating the probability of the photoelectron number in the example illustrated in FIG. 17. In FIGS. 18 to 21, the Poisson distribution corresponding to the average photon number is illustrated and $P(k_0|x)$ corresponding to the assumed photon number is illustrated. In the example illustrated in FIG. 18, since the assumed photon number is "92," the average photon number of the target pixel is about 105.29. In FIG. 18, the probability with which the assumed photon number is "92" when the pixel value is 92.6 appears at the position of the photoelectron number of 92.6 [e].

Figure 19:
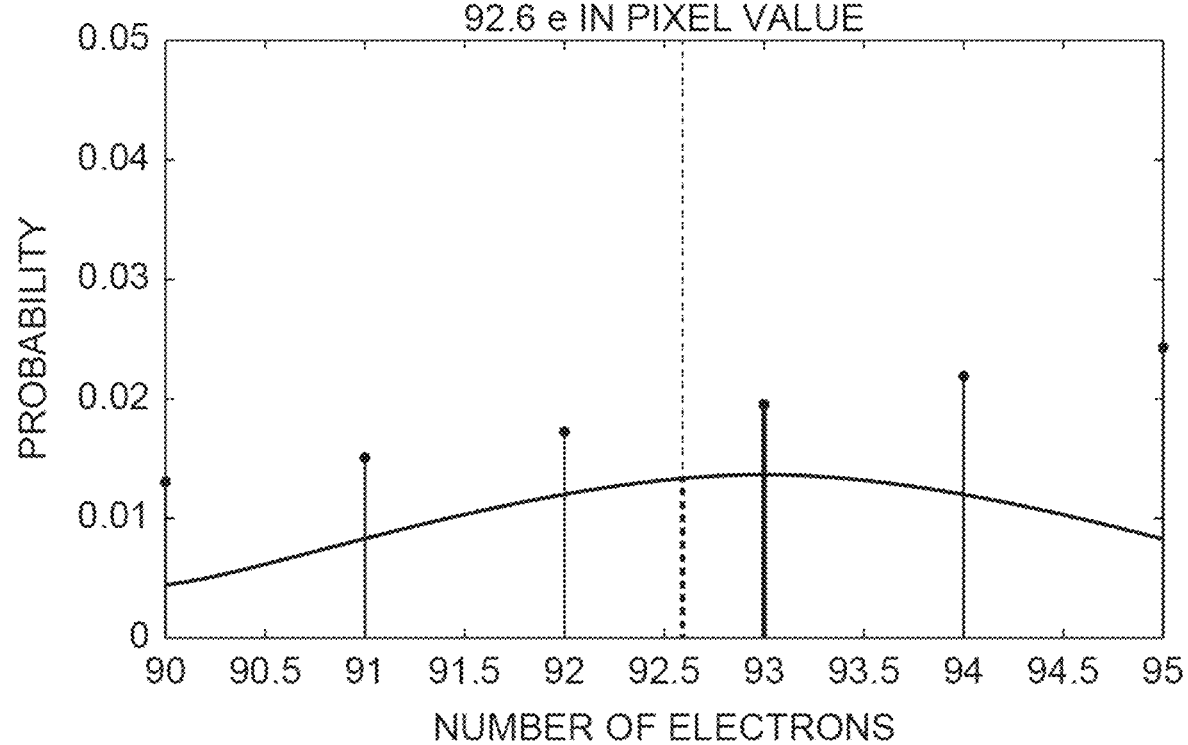
FIG. 19 is a diagram illustrating a probability distribution of photoelectron number.
Figure 20:
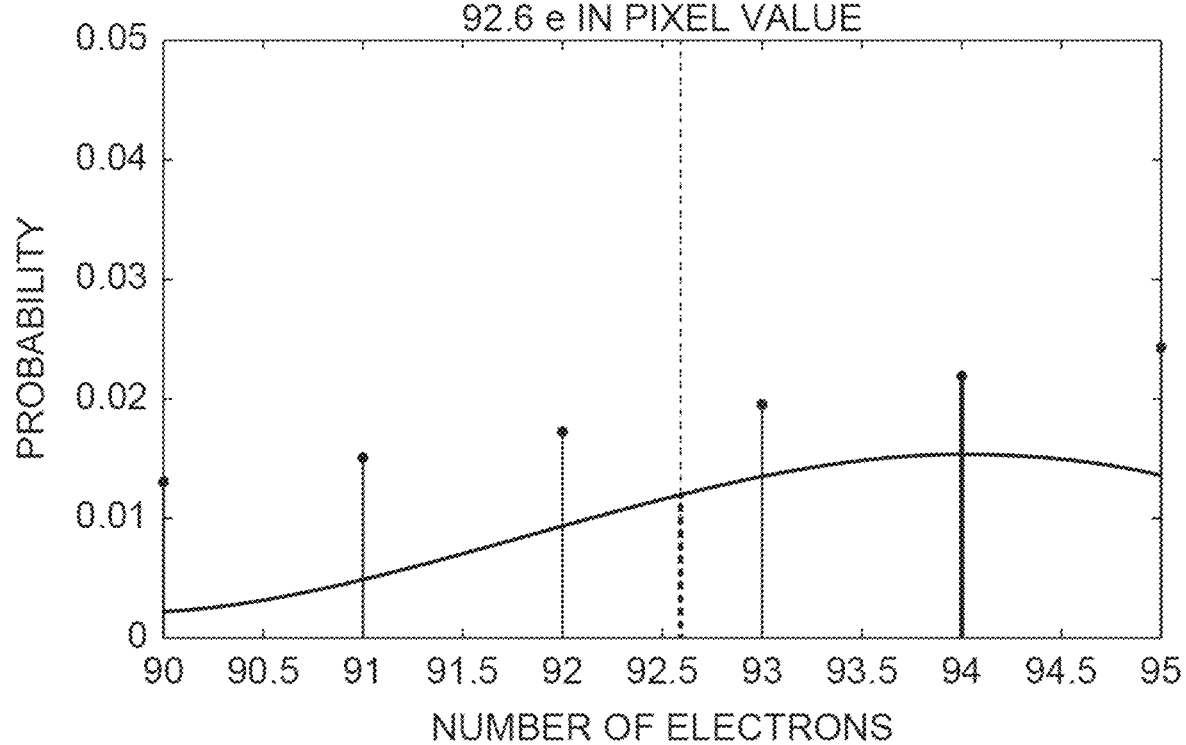
FIG. 20 is a diagram illustrating a probability distribution of photoelectron number.
Figure 21:
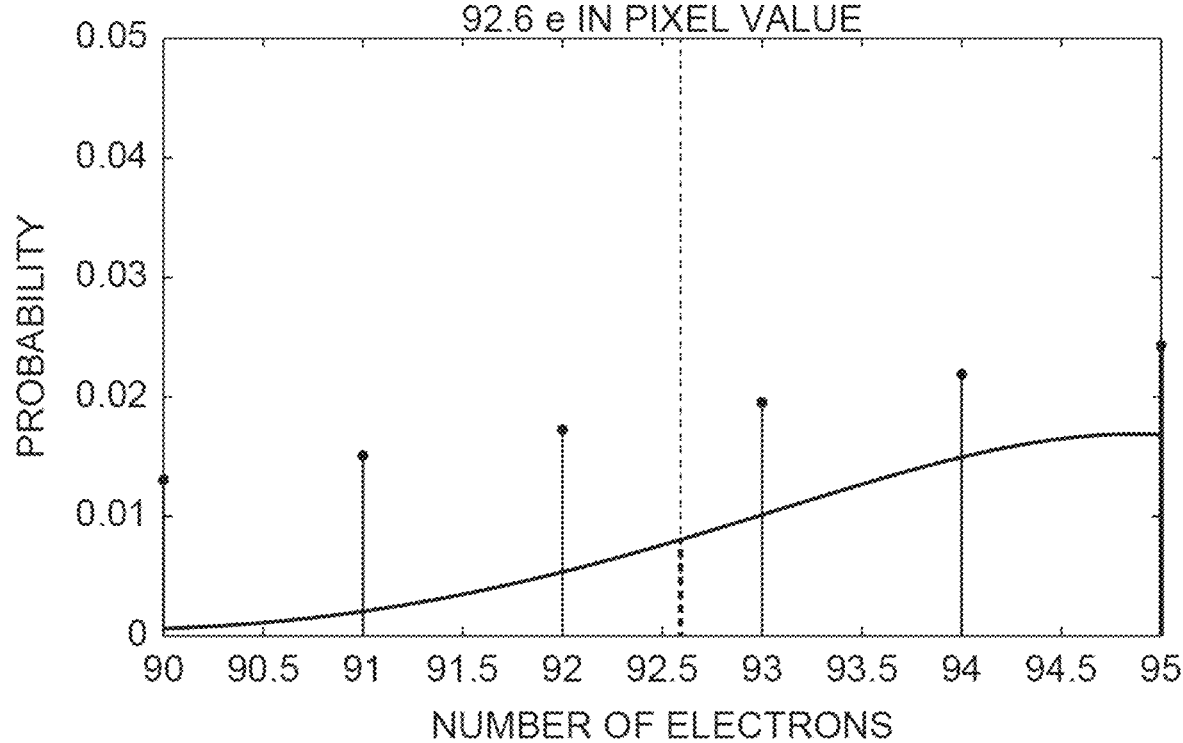
FIG. 21 is a diagram illustrating a probability distribution of photoelectron number.

Similarly, FIG. 19 is a diagram illustrating the probability of the photoelectron number when the assumed photon number is "93." In the example illustrated in FIG. 19, since the assumed photon number is "93," the average photon number of the target pixel is about 105.30. In FIG. 19, the probability with which the assumed photon number is "93" when the pixel value is 92.6 appears at the position of the photoelectron number of 92.6 [e]. FIG. 20 is a diagram illustrating the probability of the photoelectron number when the assumed photon number is "94." In the example illustrated in FIG. 20, since the assumed photon number is "94," the average photon number of the target pixel is about 105.31. In FIG. 20, the probability with which the assumed photon number is "94" when the pixel value is 92.6 appears at the position of the photoelectron number of 92.6 [e]. FIG. 21 is a diagram illustrating the probability of the photoelectron number when the assumed photon number is "95." In the example illustrated in FIG. 21, since the assumed photon number is "95," the average photon number of the target pixel is about 105.32. In FIG. 21, the probability with which the assumed photon number is "95" when the pixel value is 92.6 appears at the position of the photoelectron number of 92.6 [e].

As illustrated in FIGS. 18 to 21, the probability when the assumed photon number is "93" which is the same as the provisional photon number is higher than the probability when the assumed photon number is another assumed photon number. Accordingly, the confirmed value deriving unit 22b derives "93" as the confirmed value of the photon number of the target pixel.

Figure 22:
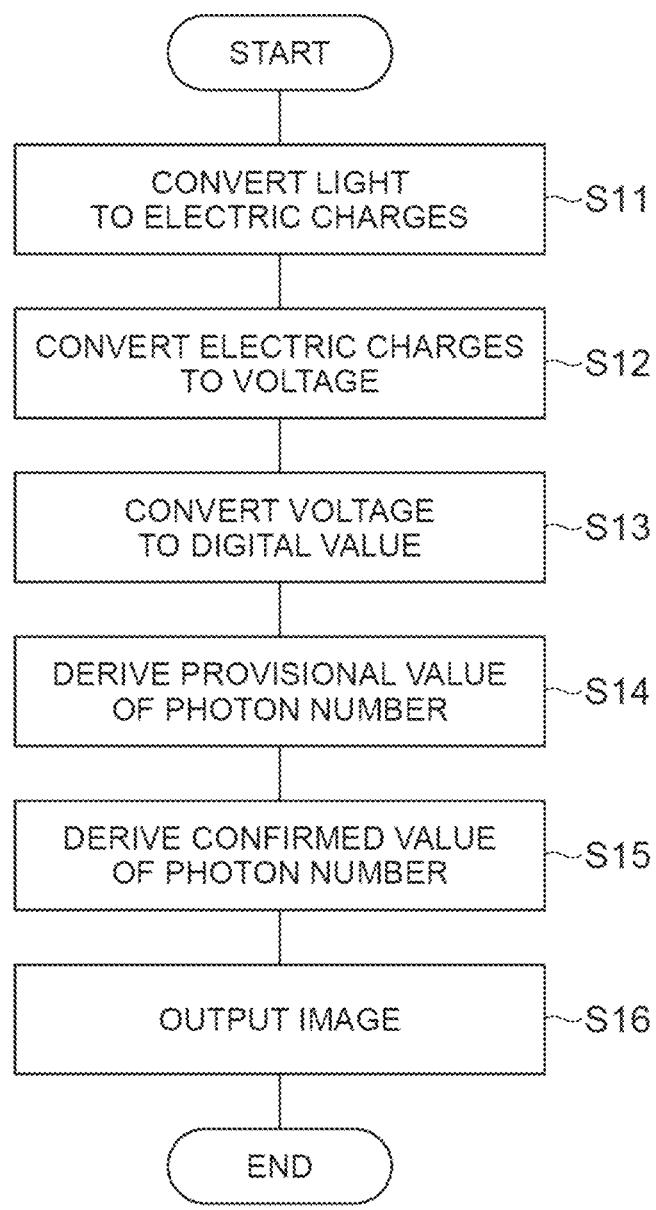
FIG. 22 is a flowchart illustrating operations of the photon counting device according to the example.

FIG. 22 is a flowchart illustrating operations (a photon counting method) of the photon counting device. In this embodiment, when measurement is started in a state in which the photon counting device 1 operates, first, photons incident on a pixel 11 of the CMOS image sensor 10 are converted to charge by the corresponding photodiode 12 (Step S11). The converted charge are converted to a voltage by the corresponding amplifier 13 (Step S12). The voltage is converted to a digital value by the A/D converter 15 and is output to the computer 20 (Step S13). The provisional value deriving unit 22a of the conversion unit 22 derives a provisional value from the digital value based on the gain and the offset value of the corresponding pixel acquired with reference to a table stored in the storage unit 21 (Step S14). The confirmed value deriving unit 22b derives a confirmed value of the photon number, for example, using Expression (9) based on the provisional value and the reading noise of the corresponding pixel (Step S15).

Figure 23:
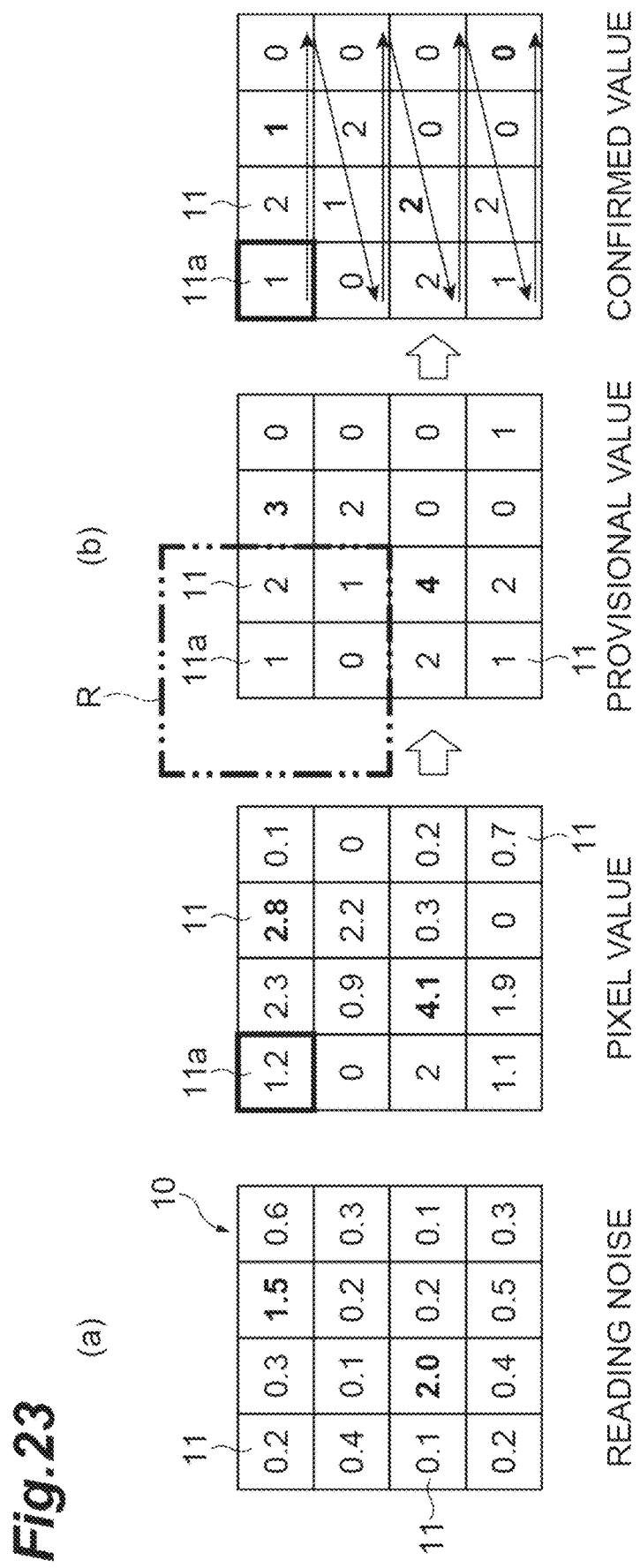
FIG. 23 is a diagram illustrating a course for deriving a confirmed value from a pixel value.

(a) of FIG. 23 is a diagram illustrating reading noise of each pixel 11 in a two-dimensional image sensor including pixels of 4 rows×4 columns. (b) of FIG. 23 is a diagram illustrating a course of deriving confirmed value from the pixel value of each pixel. The confirmed value deriving unit 22b determines the confirmed value of the photon number for each of the plurality of pixels 11 using the method described above. That is, the confirmed value deriving unit 22b prepares photon counting data including the confirmed values of the photon number in each pixel 11 based on the confirmed values derived using each of the plurality of pixels 11 as the target pixel. In (b) of FIG. 23, the pixel value of each pixel 11 is converted to a provisional value and is additionally converted to a confirmed value. For example, in a pixel 11a with a pixel value of 1.2 [e], 1 [e] is derived as the provisional value and 1 [e] is derived as the confirmed value. In a pixel with high reading noise of 1.5 [e-rms] and 2.0 [e-rms], the provisional value and the confirmed value are different values.

The neighboring pixels in the illustrated example are a pixel group in which pixels are arranged in 3 rows×3 columns with the target pixel as the center. When the target pixel is located at an edge of the two-dimensional image sensor, pixels included in an area corresponding to a pixel group in which pixels are arranged in 3 rows×3 columns with the target pixel as the center are the neighboring pixels. When a pixel 11a with a pixel value of 1.2 [e] is set as the target pixel, four pixels in the area R are the neighboring pixels. In this way, the photon number for each of the plurality of pixels is measured. The measurement result (photon counting data) is output, for example, as image data to the display device 25 (Step S16).

Figure 24:
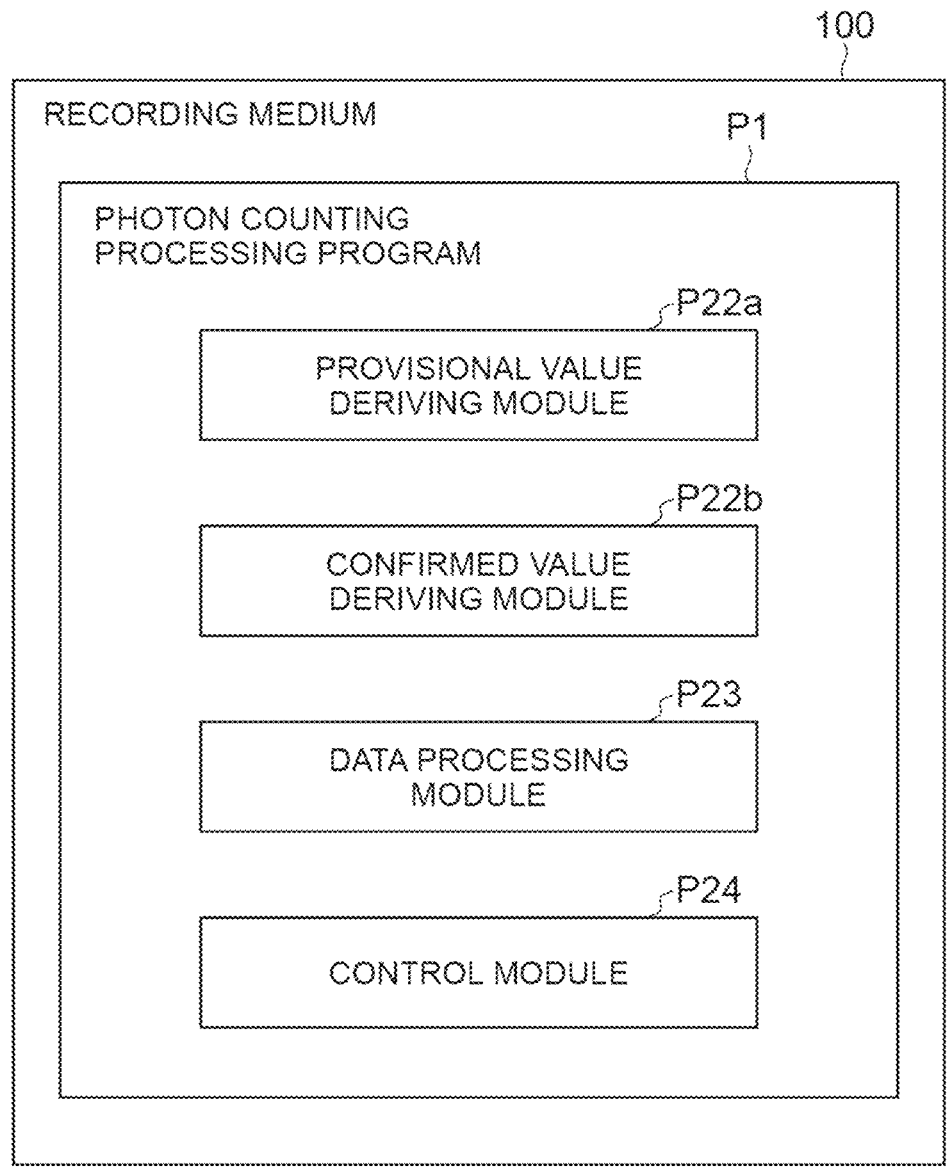
FIG. 24 is a diagram illustrating a photon counting processing program.

FIG. 24 is a diagram illustrating a recording medium 100 in which a program P1 for causing a computer to perform a photon counting process is stored. The photon counting processing program P1 stored in the recording medium 100 includes a provisional value deriving module P22a, a confirmed value deriving module P22b, a data processing module P23, and a control module P24. Functions (processes)

which are realized by executing the provisional value deriving module P22a, the confirmed value deriving module P22b, the data processing module P23, and the control module P24 are the same as the functions (processes) of the provisional value deriving unit 22a (a first derivation process), the confirmed value deriving unit 22b (a second derivation process), the data processing unit 23, and the control unit 24.

The photon counting processing program P1 is recorded in a program recording area in the recording medium 100. The recording medium 100 is constituted by, for example, a recording medium such as a CD-ROM, a DVD, a ROM, or a semiconductor memory. The photon counting processing program P1 may be provided as a computer data signal superimposed on carrier waves via a communication network.

As described above, the photon counting device 1 in the example includes a plurality of pixels 11 each including a photodiode 12 converting input light to charge and an amplifier 13 amplifying the charge to which the input light is converted by the photodiode 12 and converting the amplified charge to a voltage, an A/D converter 15 converting a voltage output from the amplifier 13 of each of the plurality of pixels 11 to a digital value, a provisional value deriving unit 22a configured to derive a provisional value of the photon number in each pixel 11 of the plurality of pixels 11 based on the digital value, and a confirmed value deriving unit 22b configured to derive a confirmed value of the photon number in a target pixel which is one of the plurality of pixels 11 based on a first probability and a second probability. The first probability is an observation probability for each photoelectron number in the target pixel based on a probability distribution of photoelectron number associated with a photon number distribution of the light, and the second probability is an observation probability for each photoelectron number at the provisional value of the target pixel based on a probability distribution of photoelectron number associated with reading noise of the target pixel.

In the photon counting device 1, the provisional value deriving unit 22a derives the provisional value of the photon number in each pixel 11 based on the magnitude of the digital value corresponding to an amount of charge generated in the corresponding pixel 11. For example, in a pixel 11 with high reading noise, an error included in the derived provisional value may increase. The confirmed value deriving unit 22b derives the confirmed value of the photon number when the target pixel indicates the provisional value based on the probability distribution of the photoelectron number associated with the photon number distribution of light and the probability distribution of the photoelectron number associated with the reading noise. In this way, the confirmed value of the photon number is derived in consideration of the magnitude of the reading noise in the target pixel. Accordingly, since an influence of the reading noise on derivation of the confirmed value can be decreased, it is possible to improve accuracy of photon counting.

In the example, the confirmed value deriving unit 22b calculates a probability for each assumed photon number when the target pixel indicates the provisional value by calculating a product of the first probability and the second probability and determines the confirmed value based on the calculated probability. With this configuration, it is possible to acquire a most probable photon number by using the assumed photon number indicating a maximum value out of the probabilities for each assumed photon number when the target pixel indicates the provisional value as the confirmed value.

In the example, the probability distribution of the photoelectron number associated with the photon number distribution of light is based on a Poisson distribution. With this configuration, it is possible to appropriately describe the probability distribution of the photoelectron number associated with the photon number distribution of light. In the example, the probability distribution of the photoelectron number associated with the reading noise of the target pixel is based on a normal distribution. With this configuration, it is possible to appropriately describe the probability distribution of the photoelectron number associated with the reading noise.

In the example, the confirmed value deriving unit 22b calculates an average value of the provisional values in neighboring pixels which are two or more pixels 11 included in a partial area around the target pixel out of the plurality of pixels 11 and calculates the first probability in consideration of the average value. More specifically, the confirmed value deriving unit 22b derives the observation probability for each photoelectron number in the target pixel based on the probability distribution of the photon number associated with the photon number distribution of light by using the average value of the provisional values of the neighboring pixels as an average photon number of the target pixel. With this configuration, it is possible to enhance the reliability of the first probability in consideration of the average value of the photoelectron number in the neighboring pixels.

In the example, the confirmed value deriving unit 22b includes a noise map indicating the reading noise in each of the plurality of pixels 11. That is, the confirmed value deriving unit 22b refers to the noise map according to necessity. The confirmed value deriving unit 22b can derive the second probability with reference to data including the noise map. For example, the confirmed value deriving unit 22b can calculate a weighted average with reference to the noise map.

In the example, the confirmed value deriving unit 22b calculates a weighted average including the reading noise of the neighboring pixels as a weighting as the average value. With this configuration, it is possible to obtain an average value with enhanced reliability of the photoelectron number in the neighboring pixels in which the reading noise is low.

In the example, the average value is a weighted average including distances between the target pixel and each of the neighboring pixels as a weighting. With this configuration, it is possible to obtain an average value with enhanced reliability of the photoelectron number in the neighboring pixels near the target pixel.

When the reading noise in the target pixel is small as illustrated in FIGS. 11 to 16, the reliability of the provisional value in the target pixel is high, and a difference between the provisional value and the confirmed value in the target pixel is less likely to occur. According, in the example, when the reading noise of the target pixel is small, the confirmed value deriving unit 22b may derive the same value as the provisional photon number of the target pixel as the confirmed value of the target pixel. That is, the confirmed value deriving unit 22b may prepare photon counting data of a plurality of pixels based on the confirmed value derived using a pixel with reading noise equal to or greater than a predetermined value out of the plurality of pixels as the target pixel and the provisional value of a pixel with reading noise less than the predetermined value out of the plurality of pixels. In this case, when a pixel with reading noise less than the predetermined value is used as the target pixel, an arithmetic operation of deriving the probability P(k|x) is not necessary. In the example, the confirmed value deriving unit 22*b* may derive the provisional value in a pixel with reading noise less than 0.4 [e-rms] as the confirmed value. In other words, the confirmed value deriving unit 22*b* may perform the arithmetic operation of deriving the confirmed value in only a pixel with reading noise equal to or greater than 0.4 [e-rms]. The confirmed value deriving unit 22*b* can determine a pixel in which the provisional value is derived as the confirmed value and a pixel in which the arithmetic operation of deriving the confirmed value is performed with reference to the noise map.

When the provisional value in the target pixel is large as illustrated in FIGS. 17 to 21, optical shot noise is more dominant than reading noise and thus it is thought that there is a high likelihood that the provisional value indicates a true photon number. According, in the example, the confirmed value deriving unit 22*b* may prepare photon counting data of a plurality of pixels based on the confirmed value derived using a pixel with a provisional value less than a predetermined value out of the plurality of pixels as the target pixel and the provisional value of a pixel with a provisional value equal to or greater than the predetermined value out of the plurality of pixels. In this case, when a pixel with a provisional value equal to or greater than the predetermined value with which the optical shot noise is dominant (hereinafter referred to as a set value) is used as the target pixel, an arithmetic operation of deriving the probability P(k|x) is not necessary. In the example, the confirmed value deriving unit 22*b* may derive the provisional value in a pixel with a provisional value equal to or greater than the set value as the confirmed value. In other words, the confirmed value deriving unit 22*b* may perform the arithmetic operation of deriving the confirmed value in only a pixel with a provisional value less than the set value. The confirmed value deriving unit 22*b* may set the range of the assumed photon number such that a provisional value in a pixel in which the provisional value is equal to or greater than the set value is substantially derived as the confirmed value. That is, the confirmed value deriving unit 22*b* may set a range obtained by adding the provisional value of the target pixel to the range of from 0 to the set value as the range of the assumed photon number. For example, when the set value is 10 [e], the range of the assumed photon number is "0, 1, 2, . . . , 8, 9, 10, 93" in the example illustrated in FIG. 17.

FIGS. 25 and 26 illustrate output results of the photon counting device according to an embodiment. (a) of FIG. 25 illustrates an image which is formed as the result of photon counting using an electron multiplying charge coupled device (EMCCD). The image has luminance corresponding to the measured photon number. (b) of FIG. 25 illustrates an image which is formed based on digital values from the photon counting device. The image has luminance corresponding to the digital values. (c) of FIG. 25 illustrates an image which is formed based on the provisional values from the photon counting device. The image has luminance corresponding to the provisional values. (d) of FIG. 25 illustrates an image which is formed based on the confirmed values from the photon counting device. The image has luminance corresponding to the confirmed values. In FIG. 25, background light is 0 [photon/pix/frame], a signal is 1 [photon/pix/frame], an exposure time is 200 [ms] (5 [fps]), and a wavelength is 532 [nm]. In FIG. 25, numerals, squares, and combinations of three rectangles are displayed by signals. The reliability α is 10.

In (b) of FIG. 25, particularly, noise occurs in the whole image due to an influence of the reading noise. Signal parts in (c) of FIG. 25 are more clearly drawn than the signal parts of the EMCCD illustrated in (a) of FIG. 25. This is thought to be because the EMCCD has multiplication noise. On the other hand, the background parts in (c) of FIG. 25 include more noise than the background parts of EMCCD. This is thought to be because a pixel with high reading noise is included in the plurality of pixels constituting the two-dimensional image sensor. In (d) of FIG. 25 illustrating an image in which the confirmed values are reflected, clearness of the signal parts is the same as in (c) of FIG. 25. On the other hand, noise of the background part in (d) of FIG. 25 is lower than noise of the background part in (c) of FIG. 25, and an amount of noise thereof is similar to that of the background part of the EMCCD.

FIG. 26 illustrates a dark image obtained using the photon counting device. (a) of FIG. 26 illustrates an image which is formed based on the digital values from the photon counting device. (b) of FIG. 26 illustrates an image which is formed based on the provisional values from the photon counting device. (c) of FIG. 26 illustrates an image which is formed based on the confirmed values from the photon counting device.

In (a) of FIG. 26, particularly, noise occurs in the whole image due to an influence of reading noise. In (b) of FIG. 26, much noise is observed due to pixels with high reading noise. In (c) of FIG. 26 illustrating an image in which the confirmed values are reflected, an amount of noise is less than that in (b) of FIG. 26 illustrating an image in which the provisional values are reflected.

While an embodiment has been described above in detail with reference to the drawings, specific configurations are not limited to the embodiment.

For example, the neighboring pixels include a pixel group of pixels in 3 rows×3 columns centered on a target pixel, but the configuration of the neighboring pixels may be arbitrarily determined. FIGS. 27, 28, 29, and 30 illustrate other examples of the neighboring pixels. In any drawing, a pixel 11*c* serving as a target pixel and the other pixels 11 are illustrated.

FIG. 27 illustrates an example in which the neighboring pixels include a pixel group configured in a rectangular shape. The neighboring pixels illustrated in (a) of FIG. 27 include a pixel group of pixels in 3 rows×5 columns. The neighboring pixels illustrated in (b) of FIG. 27 include a pixel group of pixels in 5 rows×5 columns. In the illustrated example, the central pixel 11*c* is a target pixel, but another pixel 11 may be a target pixel. The neighboring pixels may include a pixel group of pixels in N rows×M columns or in M rows×N columns, where N is an integer equal to or greater than 1 and M is an integer equal to or greater than 2.

Figure 28:
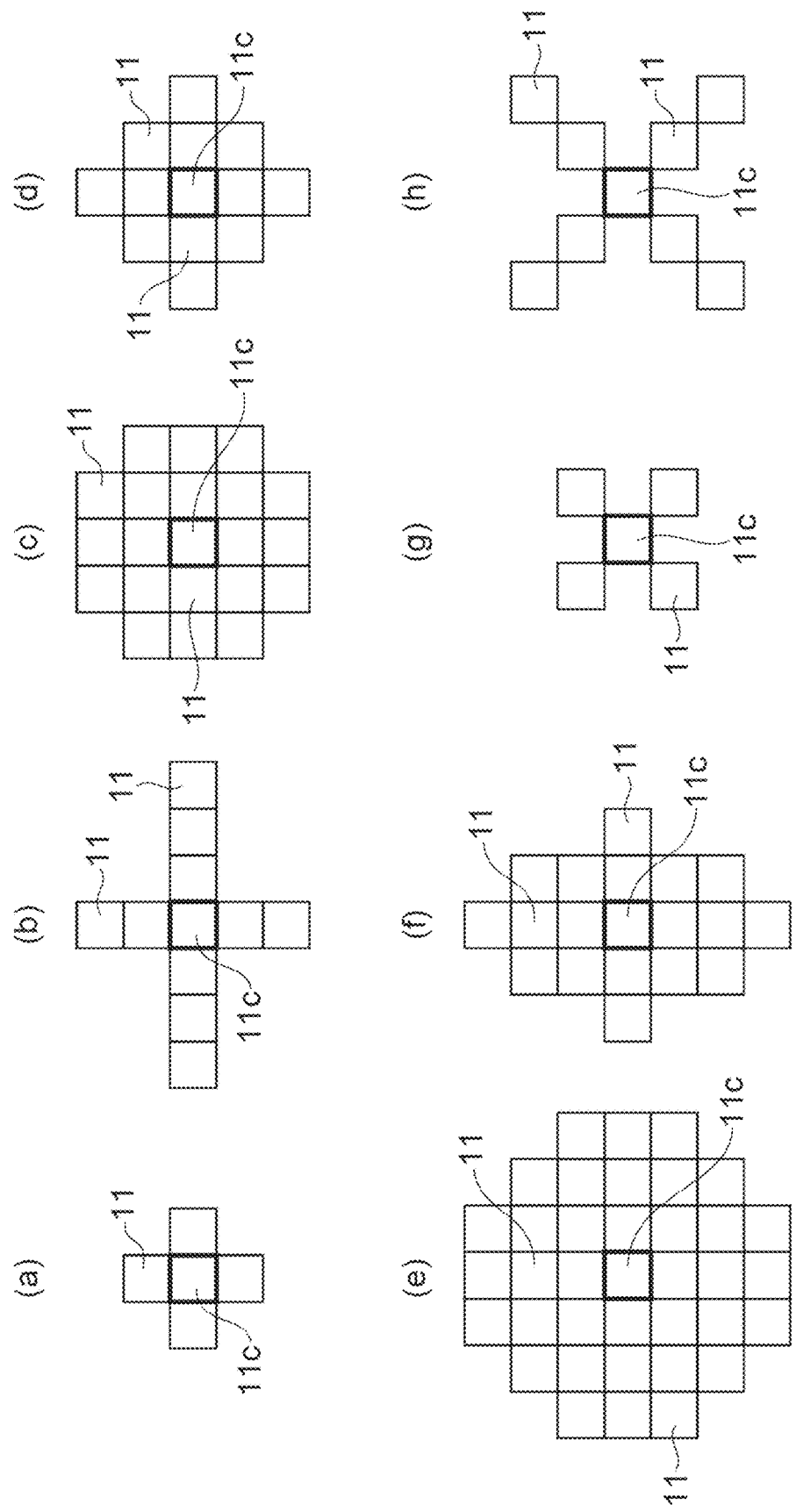
FIG. 28 is a diagram schematically illustrating another shape of neighboring pixels.

FIG. 28 illustrates an example in which the neighboring pixels include a pixel group which is symmetric with respect to a line or a point. The neighboring pixels illustrated in (a) of FIG. 28 include 5 pixels forming a cross shape. The neighboring pixels illustrated in (b) of FIG. 28 include 11 pixels forming a cross shape. In (a) and (b) of FIG. 28, a pixel 11*c* serving as a target pixel is disposed at a position at which pixels arranged in the row direction (a pixel row) and pixels arranged in the column direction (a pixel column) cross each other, but the target pixel may be another pixel 11. An example in which one pixel row and one pixel column cross each other is illustrated, but one or more pixel rows and one or more pixel columns may cross each other.

The neighboring pixels illustrated in (c) of FIG. 28 have a shape in which pixels at four corners are excluded from a pixel group of pixels in a rectangular shape (5 rows×5 columns). The neighboring pixels illustrated in (d) of FIG. 28 have a shape in which pixels at four corners are excluded from a pixel group of pixels in a rectangular shape (5 rows×5 columns). The neighboring pixels illustrated in (e) of FIG. 28 have a shape in which pixels at four corners are excluded from a pixel group of pixels in a rectangular shape (7 rows×7 columns). The neighboring pixels illustrated in (f) of FIG. 28 have a shape in which pixels at four corners are excluded from a pixel group of pixels in a rectangular shape (7 rows×5 columns).

The neighboring pixels illustrated in (g) of FIG. 28 include pixels 11 corresponding to diagonal positions of a pixel group of pixels in a rectangular shape (3 rows×3 columns). The neighboring pixels illustrated in (h) of FIG. 28 include pixels 11 corresponding to diagonal positions of a pixel group of pixels in a rectangular shape (5 rows×5 columns).

Figure 29:
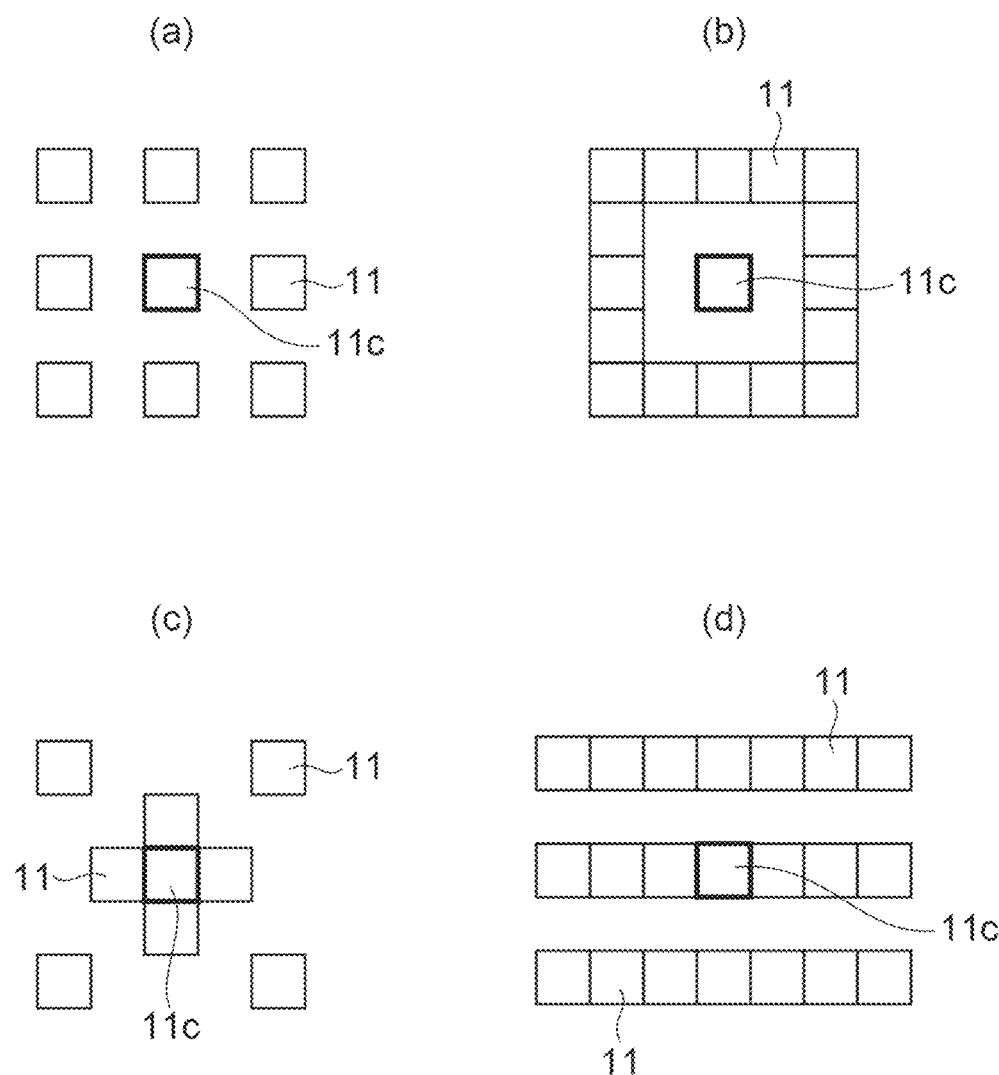
FIG. 29 is a diagram schematically illustrating another shape of neighboring pixels.

FIG. 29 illustrates an example in which the neighboring pixels include separate pixels in a pixel group of pixels which are symmetric with respect to a line or a point. The neighboring pixels illustrated in (a) of FIG. 29 include 9 pixels 11 which are separated from each other in a pixel group of pixels in 5 rows×5 columns. The neighboring pixels illustrated in (b) of FIG. 29 include 16 pixels 11 in a circumferential edge and a central pixel 11c in a pixel group of pixels in 5 rows×5 columns. The neighboring pixels illustrated in (b) of FIG. 29 include a pixel group of a cross shape including pixels at four corners and a central pixel 11c in a pixel group of pixels in 5 rows×5 columns. The neighboring pixels illustrated in (b) of FIG. 29 include a pixel group in the first row, a pixel group in the third row, and a pixel group in the fifth row in a pixel group of pixels in 5 rows×7 columns.

The neighboring pixels illustrated in (a) of FIG. 30 include pixels 11 which are arranged to form a swastika shape in a pixel group of pixels in a rectangular shape (5 rows×5 columns). The neighboring pixels illustrated in (b) of FIG. 30 include a pixel group formed in a triangular shape. In this example, one of vertices of the triangular shape is used as a target pixel, but the target pixel may be another pixel 11. The neighboring pixels illustrated in (c) of FIG. 30 include pixels 11 which are arranged to form a swirling shape in a pixel group of pixels in a rectangular shape (5 rows×5 columns). The neighboring pixels illustrated in (d) of FIG. 30 include a plurality of pixel groups which are obliquely continuous and which are separated from each other in a rectangular area (7 rows×7 columns). In the illustrated example, the neighboring pixels include pixels 11 at four corners.

The neighboring pixels illustrated in FIGS. 27 to 30 are merely examples. That is, the configuration of the neighboring pixels is not limited to the examples illustrated in FIGS. 27 to 30. For example, the neighboring pixels illustrated in FIGS. 27 to 30 may be extended based on certain regularity. For example, extension includes an increase of the number of pixels continuous in the row direction, an increase of the number of pixels continuous in the column direction, and an increase of the number of pixels continuous in an oblique direction. The neighboring pixels illustrated in FIGS. 27 to 30 may overlap each other. When the different neighboring pixels overlap, all the neighboring pixels of one or both may be extended. Regarding the neighboring pixels having different shapes when they are vertically or horizontally inverted, the original neighboring pixels and the inverted neighboring pixels may be made to overlap.

Figure 31:
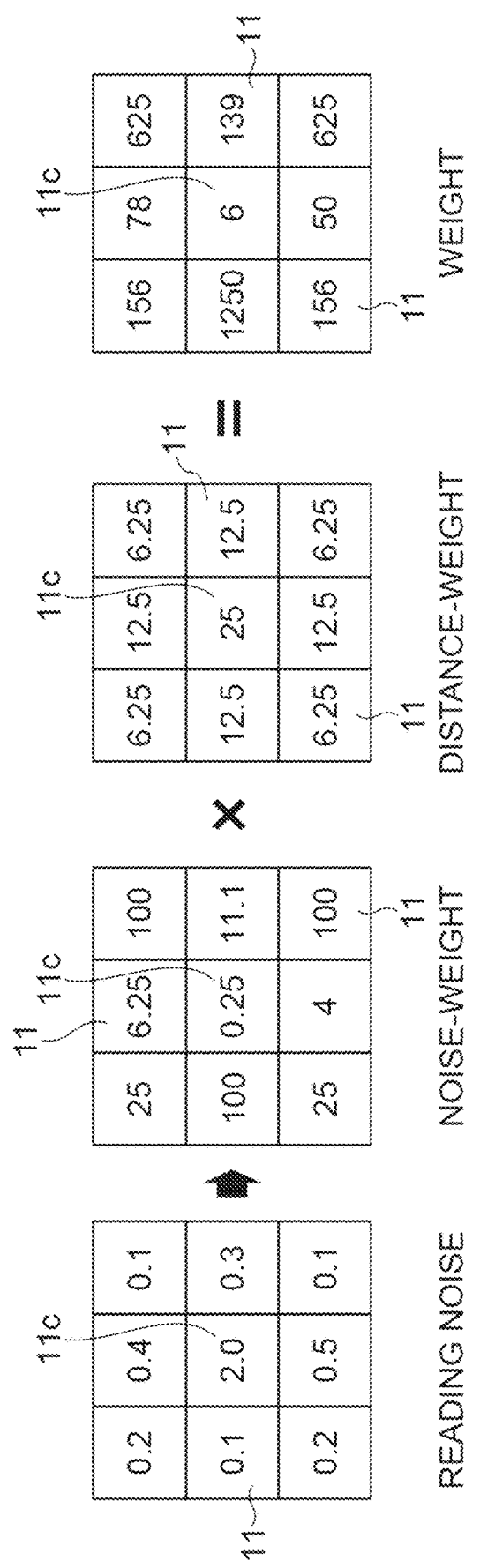
FIG. 31 is a diagram illustrating another example of a weighted average.

FIG. 31 is a diagram illustrating another example of a weighted average. FIG. 31 illustrates a noise map based on the reading noise described above in the embodiment and a map of weights based on the noise map (hereinafter referred to as noise weights in some cases). In the modified example illustrated in FIG. 31, the weight of the weighted average includes a distance weight. The distance weight is a weight of a weighted average based on distances between a target pixel and the neighboring pixels. In the example, the distance weight is set such that the weight increases as the distance decreases based on the distances between the center of the pixel 11c which is a target pixel and the centers of the neighboring pixels. For example, a mask which is used as a Gaussian filter may be used as the distance weight. In the illustrated example, a product of the noise weight and the distance weight is used as a weight of the weighted average.

Figure 32:
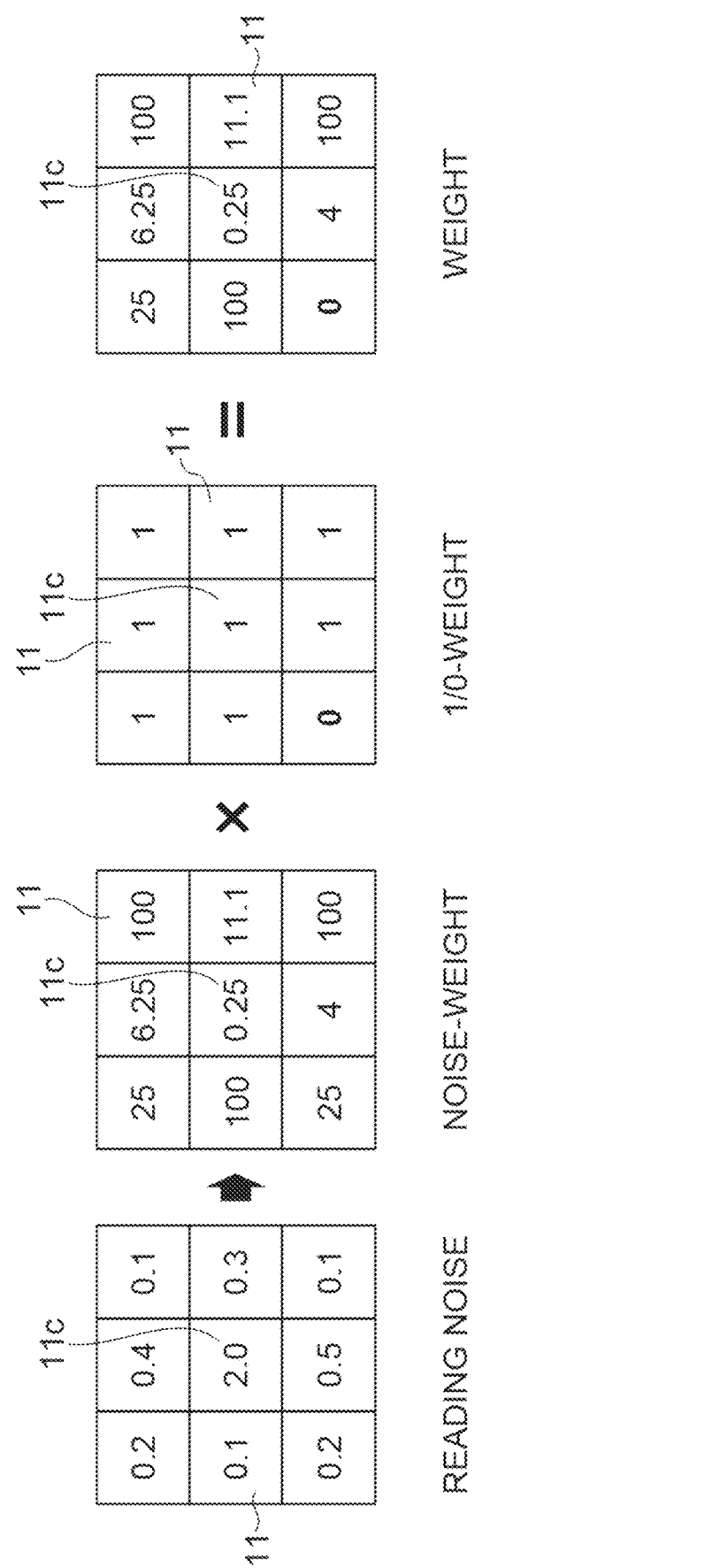
FIG. 32 is a diagram illustrating another example of a weighted average.

FIG. 32 is a diagram illustrating another example of the weighted average. In FIG. 32, the noise map corresponding to the reading noise described above in the embodiment and the map of weights based on the noise map are illustrated. In the modified example illustrated in FIG. 32, a 1/0 weight is included as the weight of the weighted average. The 1/0 weight is a weight having values of 1 or 0 set for the neighboring pixels as weighting factors. In this example, a product of the noise weight and the 1/0 weight is used as a weight of the weighted average. Accordingly, in a pixel in which the 1/0 weight is 1, the noise weight is used as a weight of the weighted average without any change. On the other hand, in a pixel in which the 1/0 weight is 0, the weight of the weighted average is 0. That is, the provisional value of a pixel in which the 1/0 weight is 0 is not used for an arithmetic operation of calculating the average photon number. For example, a defective pixel included in the plurality of pixels constituting the two-dimensional image sensor may be detected and the 1/0 weight in the detected defective pixel may be set to 0. In this case, an output of the defective pixel is not used to calculate the average photon number.

Figure 33:
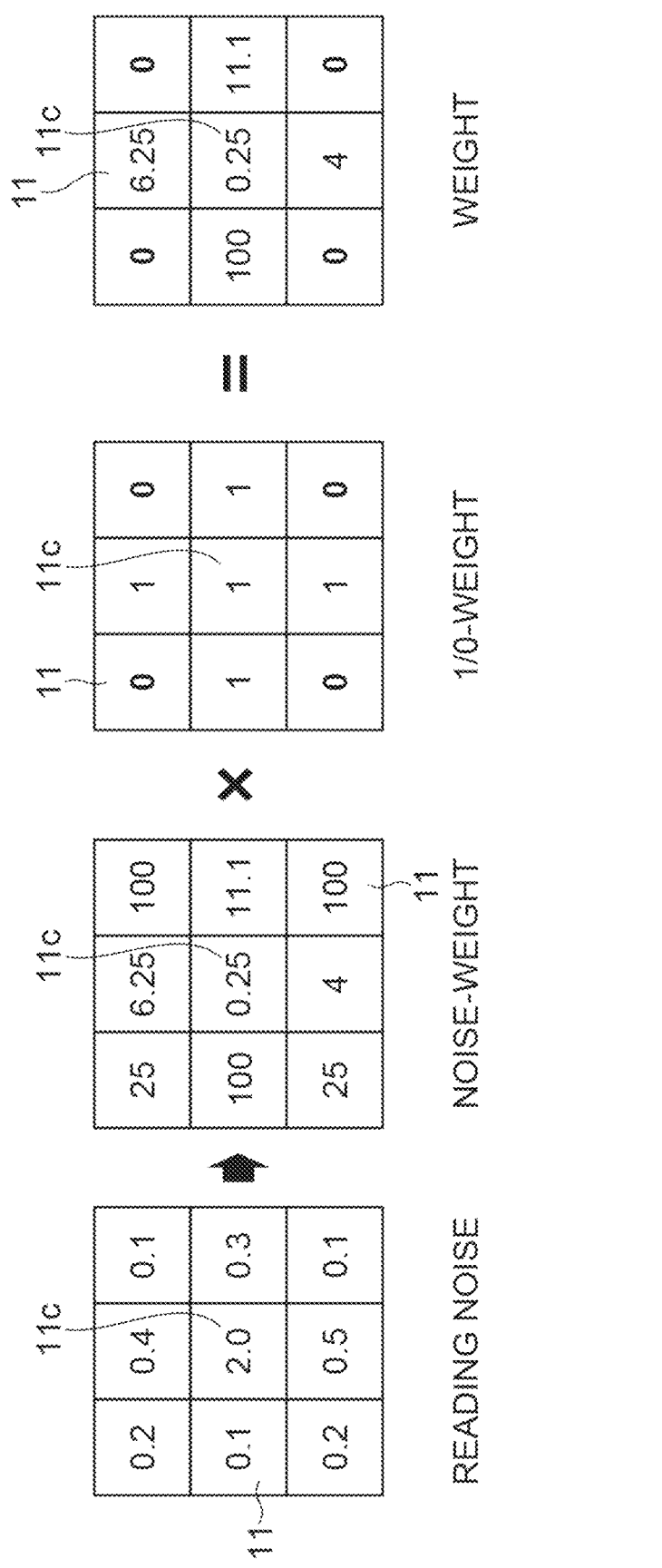
FIG. 33 is a diagram illustrating another example of a weighted average.

The 1/0 weight can be used to form the neighboring pixels having an arbitrary shape as illustrated in FIG. 33. In FIG. 33, the noise map, the map of weights based on the noise map, and the 1/0 weight are illustrated. In the 1/0 weight illustrated in FIG. 33, the weight of 5 pixels forming a cross shape is 1, and the weight of the other 4 pixels is 0. In this case, by using the product of the noise weight and the 1/0 weight as the weight of the weighted average, the neighboring pixels substantially have the same shape as the neighboring pixels illustrated in (a) of FIG. 28. In this way, it is possible to arbitrarily set the shape of the neighboring pixels by setting the 1/0 weight of an arbitrary pixel in a rectangular area to 1 and setting the 1/0 weight of the other pixels to 0 in this way.

In the embodiments described above, the first probability is derived based on the probability distribution of the photoelectron number associated with the optical shot noise such as a Poisson distribution, but the first probability has only to be derived based on the probability distribution of the photoelectron number associated with the photon number distribution of light.

For example, when the probability distribution of the photoelectron number associated with the photon number distribution of light can be estimated based on the type of a light source, the first probability may be derived based on the probability distribution corresponding to the light source. For example, when the light source is an incoherent light source such as an LED or a thermal photon source, the first probability may be derived based on a super-Poissonian distribution which is a photon number distribution in which fluctuation of the photon number is greater than the Poisson distribution. When the light source is a quantum light source, the first probability may be derived based on a sub-Poissonian distribution which is a photon number distribution in which fluctuation of the photon number is less than the Poisson distribution. In this case, the first probability may be derived based on a photon number distribution indicated by a photon number squeezed state (for example, a Fock state) of a signal photon source, or the first probability may be derived based on the photon number distribution indicated by a quantum-entangled photon state (for example, a NOON state) which is generated through spontaneous parametric down conversion (SPDC) or the like. The first probability may be derived based on a complex photon number distribution generated by a combination of modes (that is, a photon number distribution of multi-mode squeezed states) in a complex photon state using a quantum light source. When the light source is a thermal light source or a pseudo-thermal light source, the first probability may be derived based on a Bose-Einstein distribution. The first probability may be derived based on a logarithmic normal (log-normal) distribution having a shape in which a tail extends on a larger numerical value side, a uniform distribution which is a distribution in which the probabilities for the photon number are uniform, a mixed distribution which is a distribution in which a plurality of photon number distributions are combined (mixture of multiple photon distributions), or the like.

The weight for calculating the average photon number using the weighted average is not limited to the examples of the embodiments described above. When a weight for decreasing an error between the average photon number based on the weighted average and the true average photon number is used as the weight for calculating the average photon number, a weight which is calculated as follows may be used. The true average photon number may be an arithmetic mean of the true photon number of the neighboring pixels.

When the weight w for decreasing an error between the average photon number $\lambda^*$ based on a weighted average and the true average photon number $\lambda$ is calculated, the weight w for minimizing an expected value $E[(\lambda^*-\lambda)2]$ of a square error between $\lambda^*$ and $\lambda$ can be calculated. First, an expected value $E[\lambda^*]$ of $\lambda^*$ is calculated. The pixel value x conforms to the probability distribution p(x) expressed by Expression (10).

[Expression 10]

$$p(x) = \sum_k \frac{e^{-\lambda}\lambda^{*k}}{k!} \frac{1}{\sqrt{2\pi R^2}} \exp\left\{-\frac{(x-k)^2}{2R^2}\right\} \quad (10)$$

By calculating the expected value based on the probability distribution, $E[\lambda^*]=\lambda$ is obtained, and the expected value of $\lambda^*$ not depending on the weight w matches $\lambda$. Expression (11) is derived by subsequently calculating $E[(\lambda^*-\lambda)^2]$.

[Expression 11]

$$E[(\lambda^* - \lambda)^2] = \frac{\sum_i (\lambda + R_i^2)w_i^2}{\left(\sum_i w_i\right)^2} \quad (11)$$

A weight $w_i$ for minimizing Expression (11) is calculated. Expression (12) is obtained by differentiating this expression with respect to $w_j$ and setting the value to zero.

[Expression 12]

$$\left(\sum_i w_i\right)(\lambda + R_j^2)w_j - \sum_i (\lambda + R_i^2)w_i^2 = 0 \quad (12)$$

Expression (13) is obtained by rewriting the expression with respect to j=0.

[Expression 13]

$$\left(\sum_i w_i\right)(\lambda + R_j^2)w_0 - \sum_i (\lambda + R_i^2)w_i^2 = 0 \quad (13)$$

Expression (14) is obtained by calculating a difference between both sides when j≠0, and Expression (15) is derived.

[Expression 14]

$$\left(\sum_i w_i\right)\{(\lambda + R_j^2)w_j - (\lambda + R_0^2)w_0\} = 0 \quad (14)$$

[Expression 15]

$$w_j = \frac{\lambda + R_0^2}{\lambda + R_j^2}w_0 \quad (15)$$

Here, Expression (17) is satisfied for all values of i, for example, by defining $w_0$ as expressed by Expression (16). In this case, the average photon number $\lambda^*$ based on a weighted average is expressed by Expression (18).

[Expression 16]

$$w_0 = \frac{1}{\lambda + R_0^2} \quad (16)$$

[Expression 17]

$$w_i = \frac{1}{\lambda + R_i^2} \quad (17)$$

[Expression 18]

$$\lambda^* = \frac{\sum_i \frac{x_i}{\lambda + R_i^2}}{\sum_i \frac{1}{\lambda + R_i^2}} \quad (18)$$

Since the true average photon number $\lambda$ is included in Expression (17), Expression (17) cannot be calculated without any change. Therefore, for example, $w_i$ which is derived based on Expression (17) may be used as a weight based on the assumption that the average photon number calculated as an unweighted average of the neighboring pixels is defined as $\lambda$.

$w_i$ which is derived based on Expression (17) may be self-consistently resolved. That is, processes of calculating the average photon number by substituting the derived weight $w_i$ into Expression (18) (a first process) and deriving the weight $w_i$ from Expression (17) using the average photon number (a second process) may be repeated until it converges. Based on approximation between the average photon number $\lambda^*$ corresponding to the weighted average and the true average photon number $\lambda$, a solution of Expression (19) may be defined as the average photon number. Here, the solution can be obtained from Expression (20) when the function of the right side reduction mapping using a fixed point theorem. As described above, by using the weighted average including a weight for decreasing an error between the true photon number and the average value of the neighboring pixels as a weighting, it is possible to expect improvement in calculation accuracy of the average photon number.

[Expression 19]

$$\lambda^* = \frac{\sum_i \frac{x_i}{\lambda^* + R_i^2}}{\sum_i \frac{1}{\lambda^* + R_i^2}} \quad (19)$$

[Expression 20]

$$\lambda_{k+1}^* = \frac{\sum_i \frac{x_i}{\lambda_k^* + R_i^2}}{\sum_i \frac{1}{\lambda_k^* + R_i^2}} \quad (20)$$

The average photon number of the target pixel may be derived based on data of the provisional values of a plurality of frames. That is, the confirmed value deriving unit 22b may acquire data of the provisional values in a plurality of pixels corresponding to a plurality of frames and derive the average photon number based on the acquired data. For example, the confirmed value deriving unit 22b may derive the average photon number of the target pixel for each of the acquired frames and calculate the first probability using an average value of the derived average photon number as λ. The confirmed value deriving unit 22b may derive the average photon number of the target pixel using the acquired data of the provisional values corresponding to the plurality of frames as one parent population and calculate the first probability using the derived average photon number as λ. The confirmed value deriving unit 22b may calculate an average value of the provisional values for each pixel in the acquired frames and derive the average photon number using the average value as the provisional value of each pixel. As described above, by calculating the average photon number based on the data of the provisional values in the plurality of frames, it is possible to expect improvement in calculation accuracy of the average photon number.

The confirmed value deriving unit 22b may derive the photon number of which an error from the true photon number is considered to be minimized as the confirmed value. That is, the confirmed value deriving unit 22b may derive an expected value of the photon number as the confirmed value. For example, the confirmed value deriving unit 22b can derive an expected value of the photon number of the target pixel based on the first probability and the second probability, where the first probability is an observation probability for each photoelectron number in the target pixel based on the probability distribution of the photon number and the second probability is an observation probability for each photoelectron number at the provisional value of the target pixel based on the probability distribution of the photon number associated with the reading noise of the target pixel. For example, when the probability for each assumed photon number when the target pixel indicates the provisional value is expressed by Expression (21), the expected value $k_{exp}$ of the photon number is expressed by Expression (22). The range of the assumed photon number k which is calculated by the confirmed value deriving unit 22b may be a data range of the probability distribution of the photon number.

[Expression 21]

$$P_k(x) = Q_k \times \frac{1}{\sqrt{2\pi}R} \exp\left(-\frac{(x-k)^2}{2R^2}\right) \quad (21)$$

[Expression 22]

$$k_{exp} = \frac{\sum_k k \times P_k(x)}{\sum_k P_k(x)} \quad (22)$$

REFERENCE SIGNS LIST

1 Photon counting device
11 Pixel
12 Photodiode (photoelectric conversion element)
13 Amplifier
15 A/D converter
21 Storage unit
22a Provisional value deriving unit (first derivation unit)
22b Confirmed value deriving unit (second derivation unit)

The invention claimed is:

1. A device for photon counting, comprising:
a plurality of pixels each including a photoelectric conversion element configured to convert input light to charge and an amplifier configured to amplify the charge converted by the photoelectric conversion element and convert the charge to a voltage;
an A/D converter configured to convert the voltage output from the amplifier of each of the plurality of pixels to a digital value; and
a computing device comprising a first derivation unit and a second derivation unit, wherein:
the first derivation unit of the computing device configured to derive a provisional value of photon number in each of the plurality of pixels based on the digital value; and
the second derivation unit of the computing device configured to derive a confirmed value of photon number in a target pixel which is one of the plurality of pixels based on a first probability and a second probability,
wherein the first probability is an observation probability for each photoelectron number in the target pixel based on a probability distribution of photoelectron number associated with a photon number distribution of the light,
wherein the second probability is an observation probability for each photoelectron number at the provisional value of the target pixel based on a probability distribution of photoelectron number associated with reading noise of the target pixel,
wherein the first derivation unit derives the provisional value of photon number from the digital value based on threshold value data, and
wherein the second derivation unit calculates a probability for each photoelectron number when the target pixel indicates the provisional value by calculating a product of the first probability and the second probability and determining the confirmed value based on the calculated probability for each photoelectron number.

2. The device according to claim 1, wherein the probability distribution of the photoelectron number associated with the photon number distribution of the light is a Poisson distribution, a super-Poissonian distribution, a sub-Poissonian distribution, a photon number distribution in a photon number squeezed state, a photon number distribution in a quantum-entangled photon state, a photon number distribution in a multi-mode squeezed state, a Bose-Einstein distribution, a logarithmic normal distribution, a uniform distribution, or a mixed distribution.

3. The device according to claim 1, wherein the probability distribution of the photoelectron number associated with the reading noise of the target pixel is a normal distribution.

4. The device according to claim 1, wherein the second derivation unit calculates an average value of the provisional value in neighboring pixels which are two or more pixels included in a partial area around the target pixel out of the plurality of pixels and calculates the first probability in consideration of the average value.

5. The device according to claim 4, wherein the average value is a weighted average including the reading noise of the neighboring pixels as a weighting.

6. The device according to claim 4, wherein the average value is a weighted average including distances between the target pixel and each of the neighboring pixels as a weighting.

7. The device according to claim 4, wherein the average value is a weighted average including a weight for decreasing an error between the average value and an average value of a photon number in the neighboring pixels.

8. The device according to claim 4, wherein the second derivation unit calculates the average value of the provisional value based on data of the provisional value in a plurality of frames.

9. The device according to claim 1, wherein the second derivation unit prepares photon counting data for the plurality of pixels based on the confirmed value derived using a pixel with the reading noise equal to or greater than a predetermined value out of the plurality of pixels as the target pixel and the provisional value of pixels with the reading noise less than the predetermined value out of the plurality of pixels.

10. The device according to claim 1, wherein the second derivation unit prepares photon counting data for the plurality of pixels based on the confirmed value which is derived using a pixel with the provisional value less than a predetermined value out of the plurality of pixels as the target pixel and the provisional value of pixels with the provisional value equal to or greater than the predetermined value out of the plurality of pixels.

11. The device according to claim 1, wherein the second derivation unit includes a noise map indicating the reading noise in each of the plurality of pixels.

12. A method for photon counting, comprising:
deriving a provisional value of photon number in each of a plurality of pixels based on digital values corresponding to the plurality of pixels which are output from a two-dimensional image sensor including the plurality of pixels; and
deriving a confirmed value of photon number in a target pixel which is one of the plurality of pixels based on a first probability and a second probability,
wherein the deriving of the confirmed value includes:
calculating an observation probability for each photoelectron number in the target pixel as the first probability based on a probability distribution of photoelectron number associated with a photon number distribution of light; and
calculating an observation probability for each photoelectron number at the provisional value of the target pixel as the second probability based on a probability distribution of photoelectron number associated with reading noise of the target pixel,
wherein the deriving of the provisional value of photon number includes deriving the provisional value of photon number from the digital value based on threshold value data, and
wherein the deriving of the confirmed value includes calculating a probability for each photoelectron number when the target pixel indicates the provisional value by calculating a product of the first probability and the second probability and determining the confirmed value based on the calculated probability for each photoelectron number.

13. The method according to claim 12, wherein the deriving of the confirmed value includes using a Poisson distribution, a super-Poissonian distribution, a sub-Poissonian distribution, a photon number distribution in a photon number squeezed state, a photon number distribution in a quantum-entangled photon state, a photon number distribution in a multi-mode squeezed state, a Bose-Einstein distribution, a logarithmic normal distribution, a uniform distribution, or a mixed distribution as the probability distribution of the photoelectron number associated with the photon number distribution of the light.

14. The method according to claim 12, wherein the deriving of the confirmed value includes using a normal distribution as the probability distribution of the photoelectron number associated with the reading noise of the target pixel.

15. The method according to claim 12, wherein the deriving of the confirmed value includes calculating an average value of the provisional value in neighboring pixels which are two or more pixels included in a partial area around the target pixel out of the plurality of pixels and calculating the first probability in consideration of the average value.

16. The method according to claim 15, wherein the deriving of the confirmed value includes using a weighted average including the reading noise of the neighboring pixels as a weighting as the average value.

17. The method according to claim 15, wherein the deriving of the confirmed value includes using a weighted average including distances between the target pixel and each of the neighboring pixels as a weighting as the average value.

18. The method according to claim 15, wherein the deriving of the confirmed value includes using a weighted average as the average value, the weighted average including a weight for decreasing an error between the average value and an average value of a photon number in the neighboring pixels.

19. The method according to claim 15, wherein the deriving of the confirmed value includes calculating the average value of the provisional value based on data of the provisional value in a plurality of frames.

20. The method according to claim 12, further comprising preparing photon counting data for the plurality of pixels based on the confirmed value derived using a pixel with the reading noise equal to or greater than a predetermined value out of the plurality of pixels as the target pixel and the provisional value of pixels with the reading noise less than the predetermined value out of the plurality of pixels.

21. The method according to claim 12, further comprising preparing photon counting data for the plurality of pixels based on the confirmed value which is derived using a pixel with the provisional value less than a predetermined value out of the plurality of pixels as the target pixel and the provisional value of pixels with the provisional value equal to or greater than the predetermined value out of the plurality of pixels.

22. The method according to claim 12, wherein the deriving of the confirmed value includes referring to a noise map indicating the reading noise in each of the plurality of pixels.

23. A photon counting processing program, stored on a non-transitory storage medium, for causing a computer to perform a photon counting process based on digital values corresponding to a plurality of pixels which are output from a two-dimensional image sensor including the plurality of pixels, the photon counting process comprising:

a first derivation process of deriving a provisional value of photon number in each of the plurality of pixels based on the digital values; and a second derivation process of deriving a confirmed value of photon number in a target pixel which is one of the plurality of pixels based on a first probability and a second probability, wherein the first probability is an observation probability for each photoelectron number in the target pixel as the first probability based on a probability distribution of photoelectron number associated with a photon number distribution of light, and wherein the second probability is an observation probability for each photoelectron number at the provisional value of the target pixel as the second probability based on a probability distribution of photoelectron number associated with reading noise of the target pixel, wherein the first derivation process derives the provisional value of photon number from the digital value based on threshold value data, and wherein the second derivation process calculates a probability for each photoelectron number when the target pixel indicates the provisional value by calculating a product of the first probability and the second probability and determining the confirmed value of photon number based on the calculated probability for each photoelectron number.

* * * * *